US012561928B2

(12) United States Patent
Varady et al.

(10) Patent No.: US 12,561,928 B2
(45) Date of Patent: Feb. 24, 2026

(54) SYSTEMS AND METHODS FOR CALCULATING OPTICAL MEASUREMENTS AND RENDERING RESULTS

(71) Applicant: Bespoke, Inc., San Francisco, CA (US)

(72) Inventors: Eric J. Varady, San Francisco, CA (US); Stefano Giomo, Treviso (IT)

(73) Assignee: Bespoke, Inc., San Francisco, CA (US)

( * ) Notice: Subject to any disclaimer, the term of this patent is extended or adjusted under 35 U.S.C. 154(b) by 109 days.

(21) Appl. No.: 18/357,111

(22) Filed: Jul. 22, 2023

(65) Prior Publication Data

US 2024/0135664 A1 Apr. 25, 2024

Related U.S. Application Data

(60) Provisional application No. 63/391,617, filed on Jul. 22, 2022, provisional application No. 63/391,540, filed on Jul. 22, 2022.

(51) Int. Cl.
| | |
|---|---|
| *G06T 19/20* | (2011.01) |
| *G06Q 30/0601* | (2023.01) |
| *G06T 7/246* | (2017.01) |
| *G06T 7/60* | (2017.01) |
| *G06T 7/73* | (2017.01) |

(52) U.S. Cl.
CPC ......... *G06T 19/20* (2013.01); *G06Q 30/0631* (2013.01); *G06T 7/251* (2017.01); *G06T 7/60* (2013.01); *G06T 7/74* (2017.01); *G06T 2200/24* (2013.01); *G06T 2207/30201* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

| | | | | |
|---|---|---|---|---|
| 6,508,553 | B2 * | 1/2003 | Gao ..................... | G02C 13/003 |
| | | | | 351/227 |
| 9,303,982 | B1 * | 4/2016 | Ivanchenko ........... | G01B 11/22 |
| 2013/0314413 | A1 * | 11/2013 | Coon ..................... | A61B 3/111 |
| | | | | 345/420 |
| 2014/0293220 | A1 * | 10/2014 | Kornilov ................ | G02C 7/027 |
| | | | | 351/204 |

(Continued)

FOREIGN PATENT DOCUMENTS

WO WO-2018191784 A1 * 10/2018

*Primary Examiner* — Ryan M Gray
(74) *Attorney, Agent, or Firm* — Bookoff McAndrews, PLLC

(57) ABSTRACT

Systems and methods are disclosed for determining optical measurements for adjusting virtual try-on glasses. The method includes receiving a digital input including an image of a user's face and a known-sized object, wherein the known-sized object is positioned against a screen adjacent to a camera of a user device. A plurality of instructions is generated in a user interface of the user device for tracking eye movements of the user, wherein the plurality of instructions advises the user to look at the first feature of the known-sized object, a second feature of the known-sized object, and into a distance beyond the known-sized object. A scaled reconstruction of the user's face and/or a recommendation on virtual try-on glasses is generated based on the tracking of the eye movements and/or calculations based on equations.

18 Claims, 26 Drawing Sheets

100

(56) References Cited

U.S. PATENT DOCUMENTS

| | | | | |
|---|---|---|---|---|
| 2015/0055085 A1* | 2/2015 | Fonte | .................... | G02C 7/024 |
| | | | | 700/98 |
| 2015/0055086 A1* | 2/2015 | Fonte | .................. | H04L 65/403 |
| | | | | 700/98 |
| 2016/0062151 A1* | 3/2016 | Fonte | .................... | B29D 12/02 |
| | | | | 351/204 |
| 2016/0353987 A1* | 12/2016 | Carrafa | ............... | A61B 3/0041 |
| 2017/0024898 A1* | 1/2017 | Spector | .................. | G06T 7/143 |
| 2018/0096537 A1* | 4/2018 | Kornilov | ............... | G06V 20/20 |
| 2019/0012784 A1* | 1/2019 | Wiley | .................... | G16H 30/20 |
| 2021/0342657 A1* | 11/2021 | Suezawa | ................ | G06F 1/163 |
| 2022/0351467 A1* | 11/2022 | Selivanov | ............. | G06V 40/16 |
| 2023/0103129 A1* | 3/2023 | Morrell | .................... | G06T 7/55 |
| | | | | 382/206 |
| 2023/0252745 A1* | 8/2023 | Aleem | .................. | G06T 19/20 |
| | | | | 345/419 |
| 2023/0360350 A1* | 11/2023 | Kulkarni | ................ | G06T 17/00 |

* cited by examiner

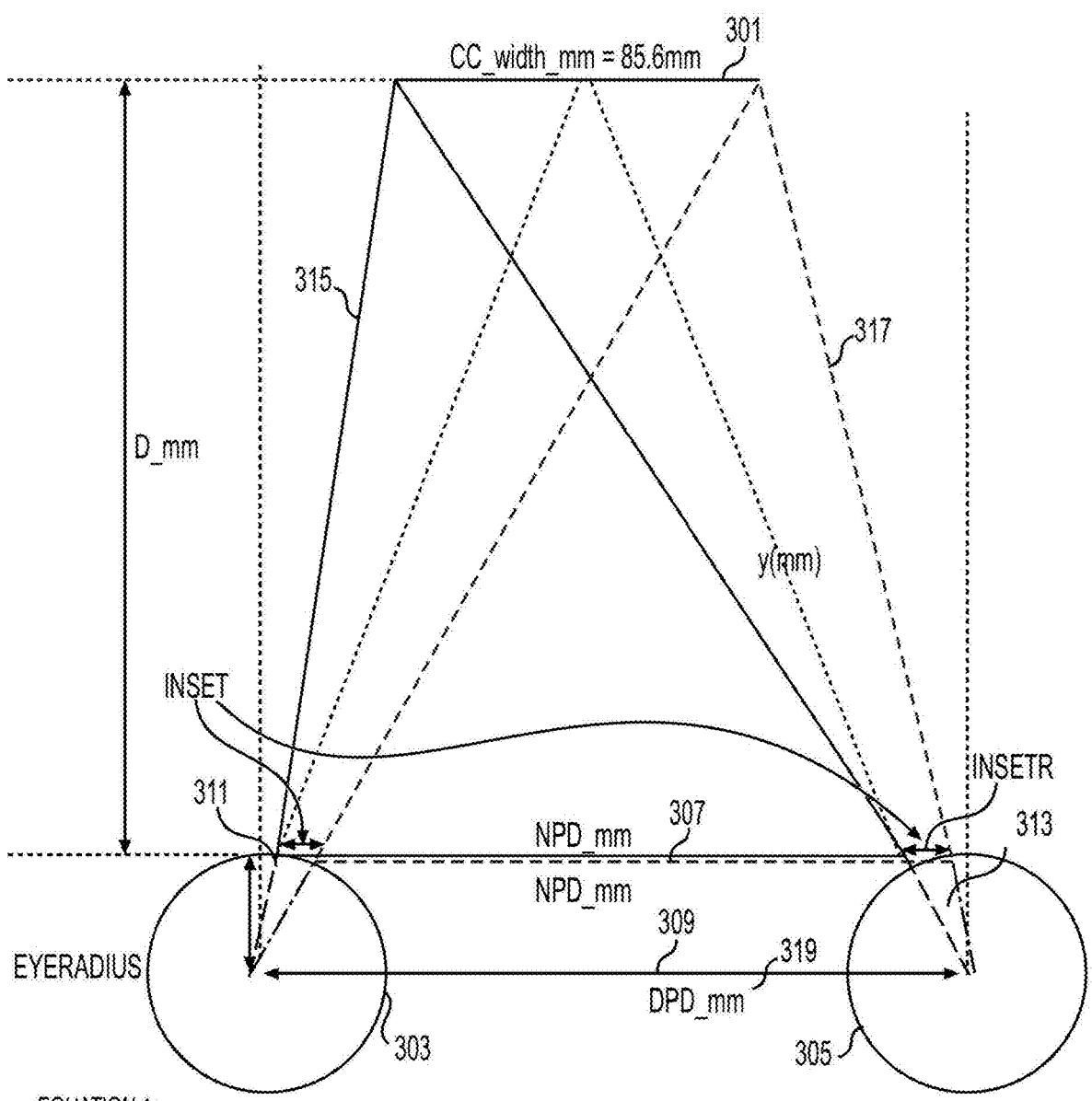

EQUATION 1:
CC_width_mm/(D_mm+EyeRadius_mm) = inset_pixels/EyeRadius_mm
    SOLVE FOR D_mm = CC_width_mm/(inset_pixels/EyeRadius_mm)) - EyeRadius_mm

INSETL+NPD ~= DPD
INSETL = INSETR = INSET

SUBSTITUTING EQUATION #1 SOLUTION FOR D INTO EQUATION 2, THEN SOLVING FOR PIXEL-TO-MM

EQUATION 2:
(DPD_pixels*pixels-to-mm)/(D_mm+eyeRadius_mm) = (NPD_pixels*pixels-to-mm)/D_mm pixel-to-mm = ((CC_width_mm * DPD_pixels) - (CC_width_mm * NPD_pixels)) / (DPD_pixels * inset_pixels)

DPD_mm = DPD_pixels * pixel-to-mm

*FIG. 3*

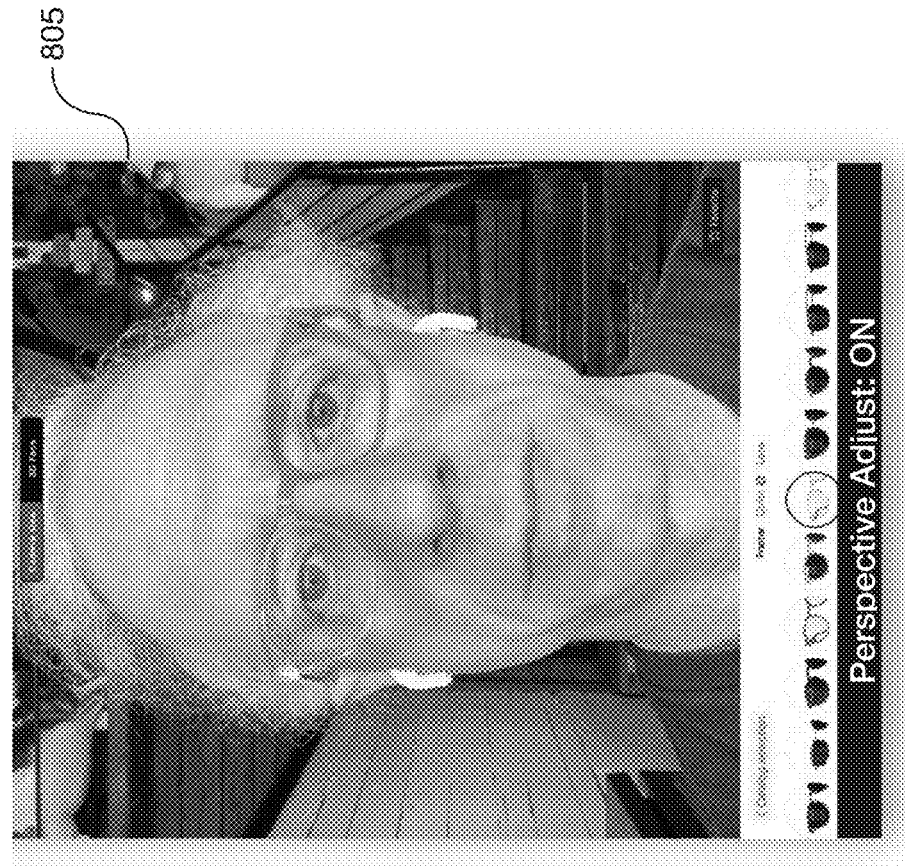
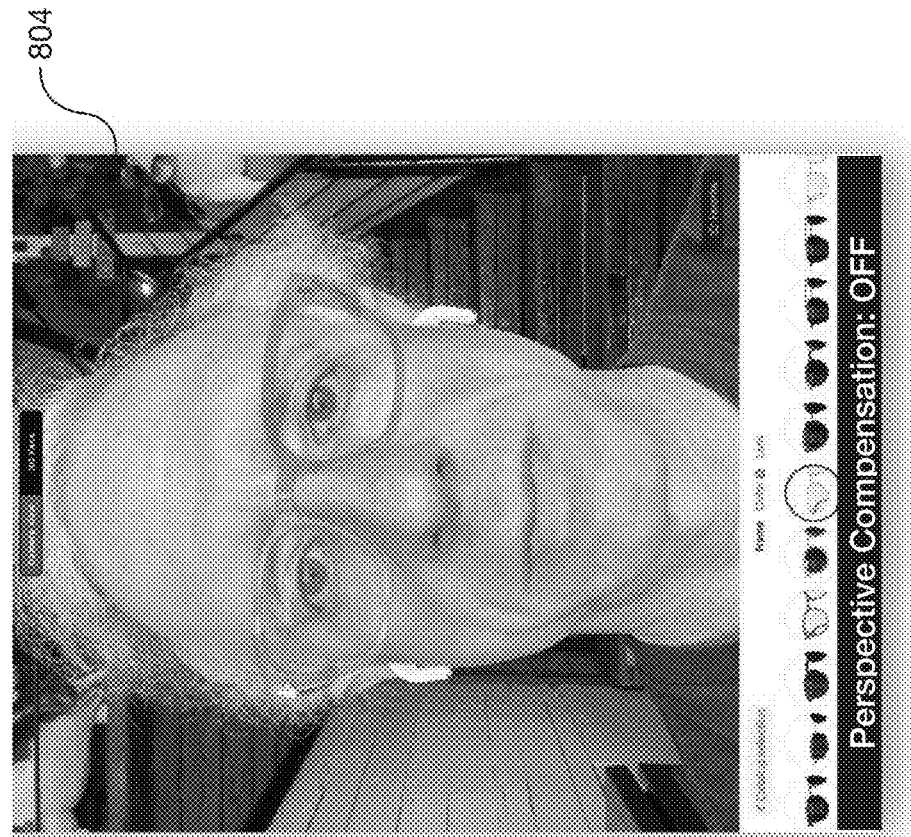
*FIG. 8C*

807
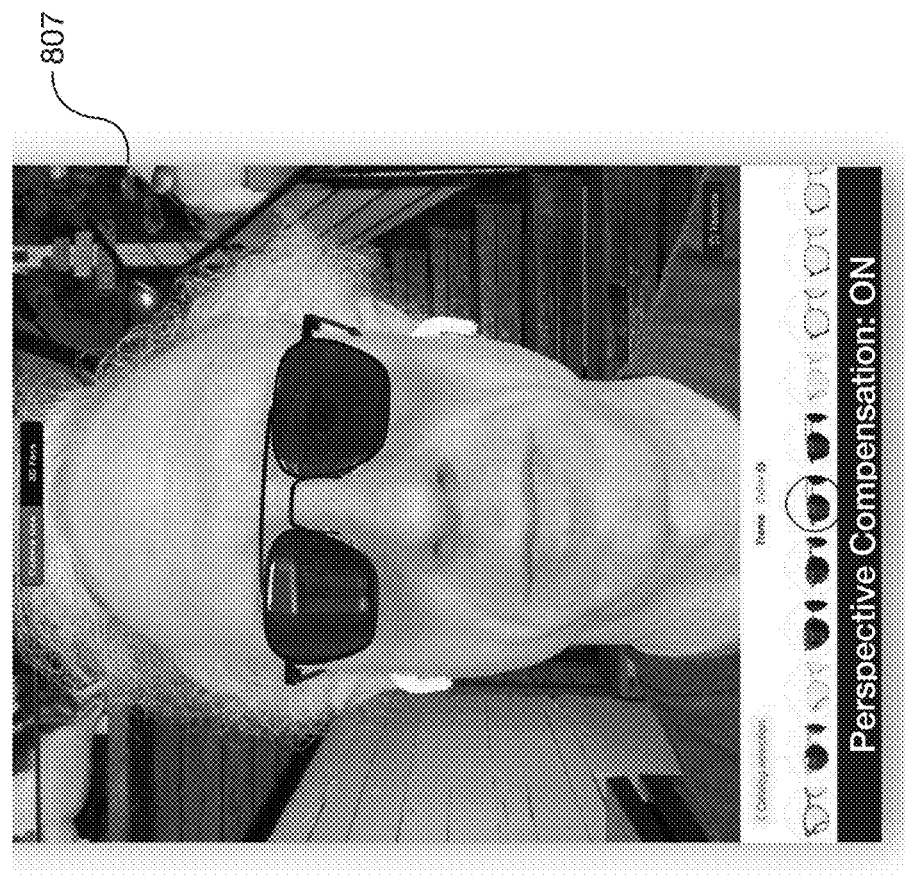
806
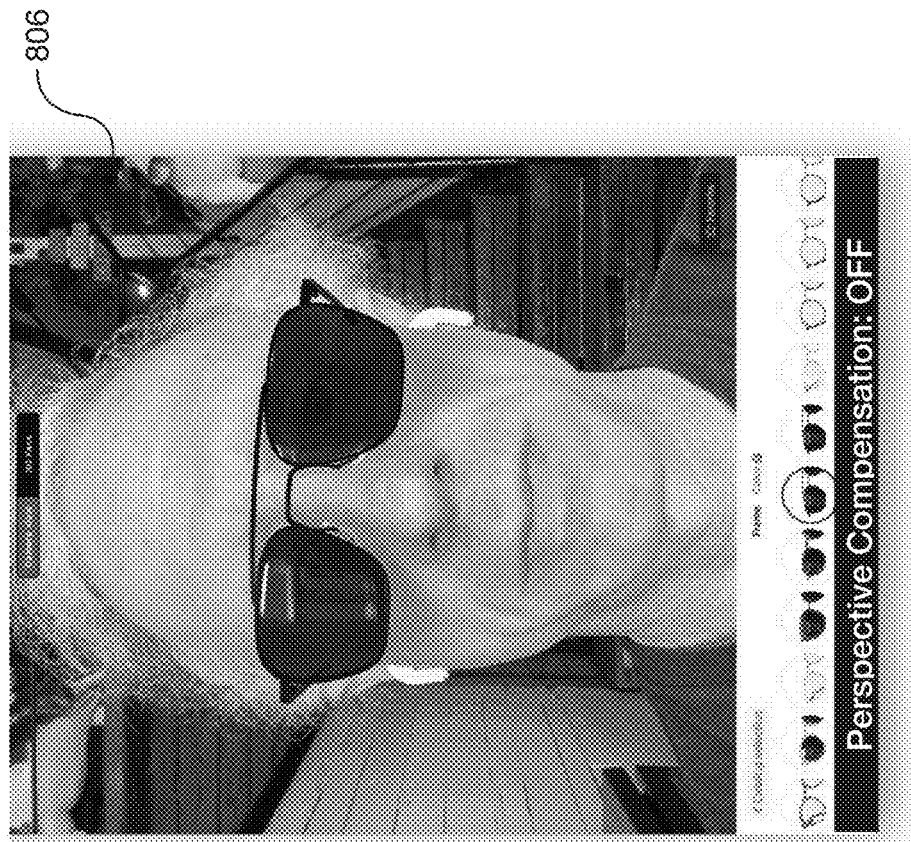
*FIG. 8D*

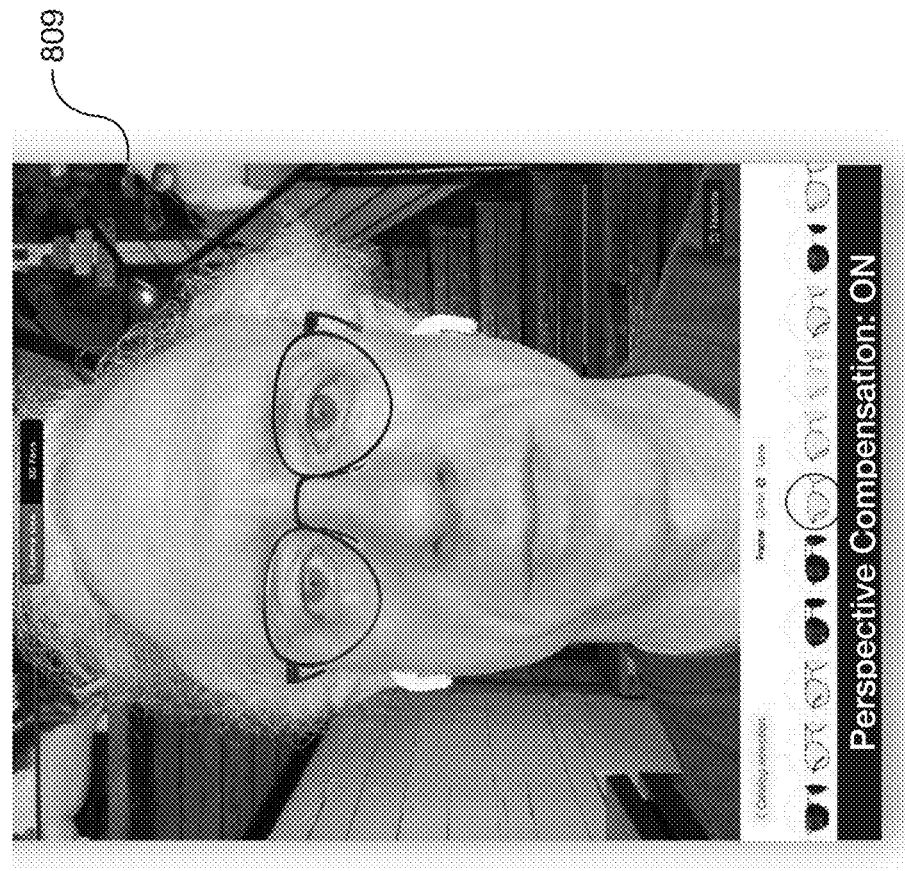
*FIG. 8E*

810 — Captured at 250mm

811 — Captured at 350mm

812

812

The same face captured at two different camera distances.

The same eyewear frame is rendered onto the face in each image.

Perspective Compensation OFF:

Glasses appear different sizes relative to the face.

813

Captured at 250mm

814

Captured at 350mm

815

815

The same face captured at two different camera distances.

The same eyewear frame is rendered onto the face in each image.

Perspective Compensation ON:

Glasses are perceived to be the same size relative to the face.

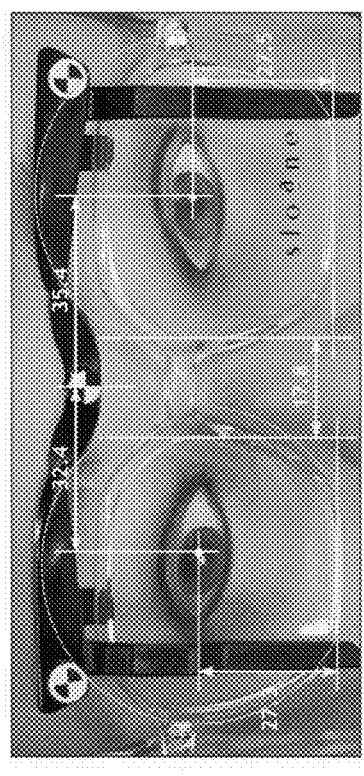
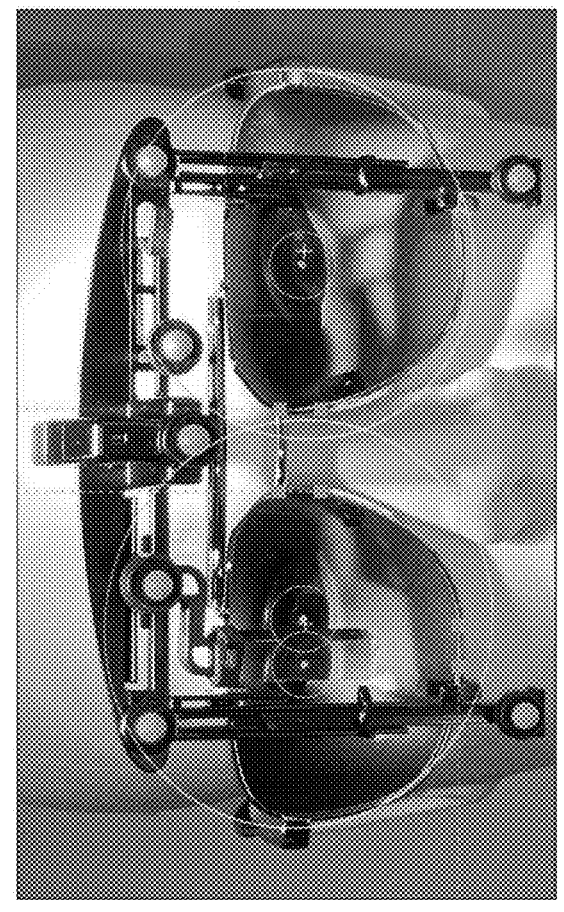
FIG. 9A

901

902

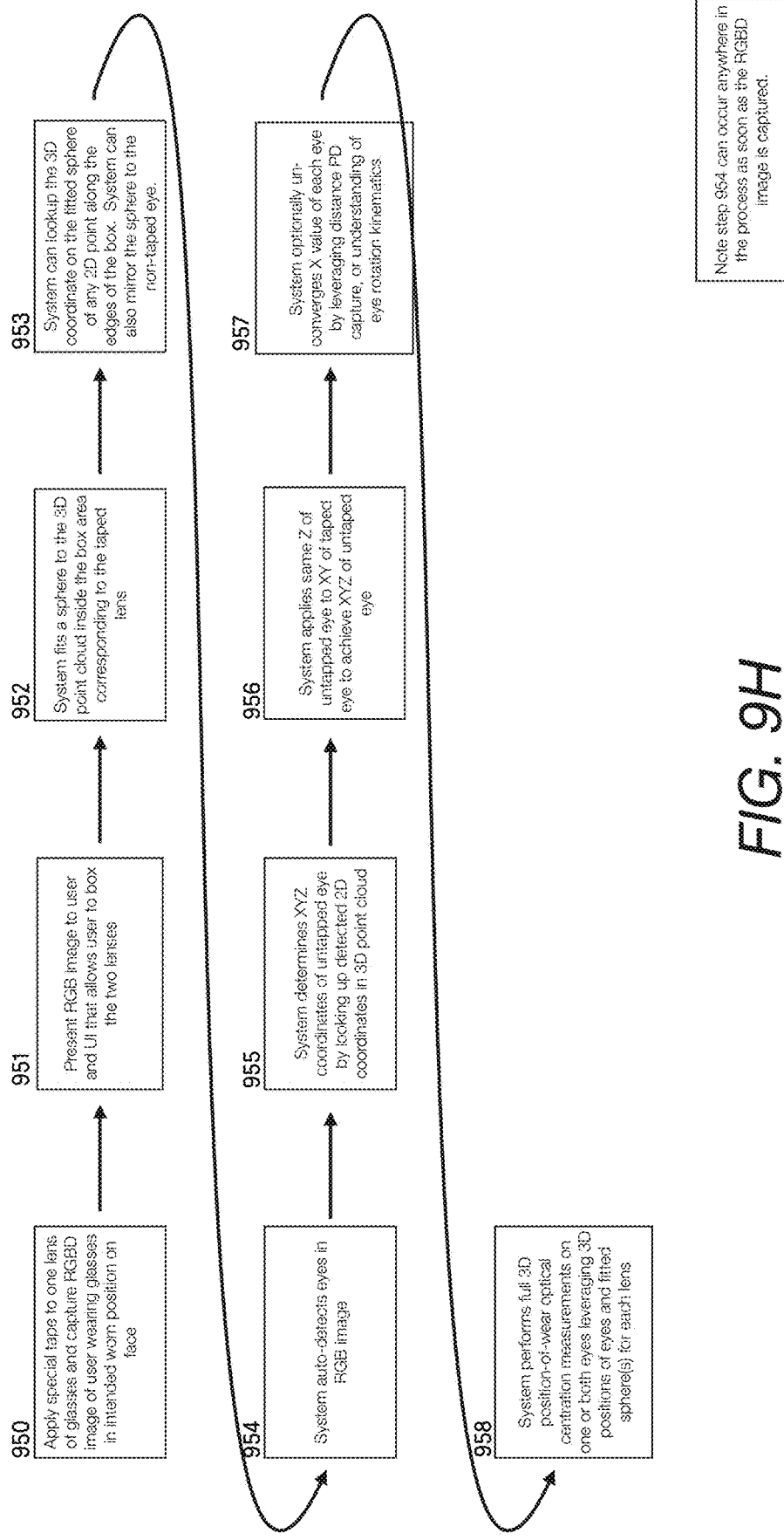

950 — Apply special tape to one lens of glasses and capture RGBD image of user wearing glasses in intended worn position on face 951 — Present RGB image to user and UI that allows user to box the two lenses 952 — System fits a sphere to the 3D point cloud inside the box area corresponding to the taped lens 953 — System can lookup the 3D coordinate on the fitted sphere of any 2D point along the edges of the box. System can also mirror the sphere to the non-taped eye.

954 — System auto-detects eyes in RGB image

955 — System determines XYZ coordinates of untapped eye by looking up detected 2D coordinates in 3D point cloud 956 — System applies same Z of untapped eye to XY of taped eye to achieve XYZ of untaped eye 957 — System optionally un-converges X value of each eye by leveraging distance PD capture, or understanding of eye rotation kinematics 958 — System performs full 3D position-of-wear optical centration measurements on one or both eyes leveraging 3D positions of eyes and fitted sphere(s) for each lens Note step 954 can occur anywhere in the process as soon as the RGBD image is captured.

FIG. 9H

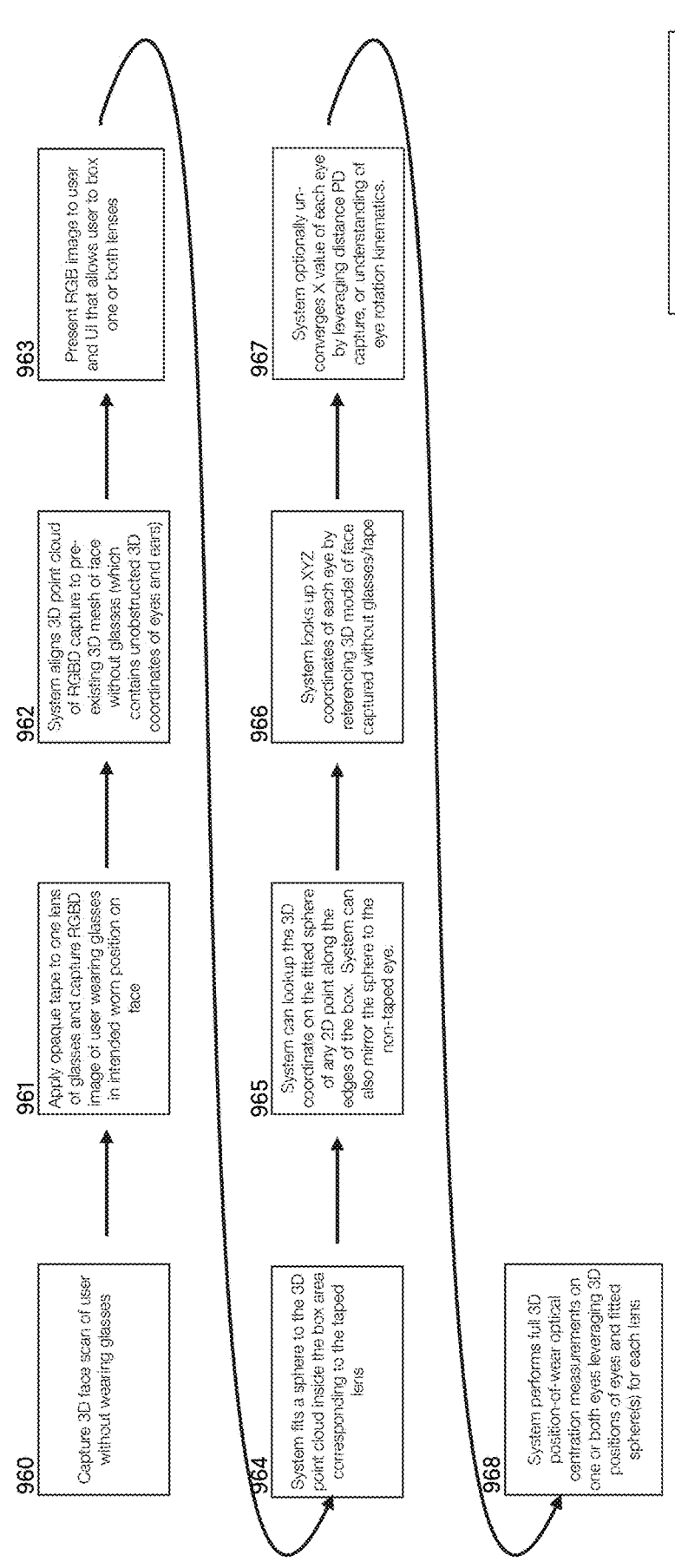

960

Capture 3D face scan of user without wearing glasses

961

Apply opaque tape to one lens of glasses and capture RGBD image of user wearing glasses in intended worn position on face

962

System aligns 3D point cloud of RGBD capture to pre-existing 3D mesh of face without glasses (which contains unobstructed 3D coordinates of eyes and ears)

963

Present RGB image to user and UI that allows user to box one or both lenses

964

965

System can lookup the 3D coordinate on the fitted sphere of any 2D point along the edges of the box. System can also mirror the sphere to the non-taped eye.

966

System looks up XYZ coordinates of each eye by referencing 3D model of face captured without glasses/tape

967

System optionally un-converges X value of each eye by leveraging distance PD capture, or understanding of eye rotation kinematics.

968

System performs full 3D position-of-wear optical centration measurements on one or both eyes leveraging 3D positions of eyes and fitted sphere(s) for each lens System fits a sphere to the 3D point cloud inside the box area corresponding to the taped lens Note steps 962 & 963 can happen in order shown, or 963 can precede 962, or 962 and 963 can occur in parallel.

Also note step 966 can occur anywhere in the process as soon as the RGBD image is captured.

*FIG. 9I*

SYSTEMS AND METHODS FOR CALCULATING OPTICAL MEASUREMENTS AND RENDERING RESULTS

RELATED APPLICATIONS

The present application is a nonprovisional of and claims the benefit of priority to U.S. Provisional Patent Application No. 63/391,540, filed Jul. 22, 2022 by Eric J. Varady and Stefano GIOMO, entitled SYSTEMS AND METHODS FOR CALCULATING USER PUPILLARY DISTANCE BY TRACKING USER EYE MOVEMENT, and U.S. Provisional Patent Application No. 63/391,617 filed Jul. 22, 2022, by Eric J. Varady entitled SYSTEMS AND METHODS FOR CUSTOMIZING PRODUCTS BASED ON INDIVIDUAL FACIAL FEATURES, the entire contents of which are hereby incorporated herein by reference.

TECHNICAL FIELD

Various embodiments of the present disclosure relate generally to scaling objects based on imaging data. In particular, systems and methods are disclosed for an improved determination of the scale and/or dimension of human anatomy in order to render the anatomy accurately in a virtual try-on environment for a custom product, stock product, or adjusted stock product. Beyond rendering, accurate scale estimation is needed to solve for optical measurements, proper eyewear fit, and how to pre-adjust a frame to fit a customer not physically-present in order to deliver said eyewear to the home and be assured of out-of-box fit and store-quality vision outcomes (or have ready for expedited in-store pickup). Scale is also necessary to solve for proper 3D placement of elements, electronics, displays, etc. on the surface of, embedded within, or at the periphery of a lens with respect to the as-worn pupil position.

Various embodiments of the present disclosure also relate to novel means to determine optical measurements without need for cumbersome clip-on devices that provide fiducials to a camera system.

Various embodiments of the present disclosure also relate to the ability to render a frame, and subsequently adjust a frame, with the necessary adjustments to ensure proper fit and optics for an individual.

Various embodiments of the present disclosure also relate to the ability to improve the perceived quality of an eyewear virtual try-on in which images of a face were captured very close to the camera—in these instances the rendered eyewear, if rendered physically-accurately, would appear to be much larger than the face, but the embodiments described herein intelligently but realistically deform eyewear prior to rendering onto a face to give an appearance that the image was captured from a farther away camera distance, giving a customer a better sense of relative size of face to eyewear.

Various embodiments of the present disclosure also enable enhanced frame fitting algorithms that incorporate the unique adjustability and optical constraints of smart eyewear (eyewear with an integrated display) that are above and beyond those of traditional (non-smart) ophthalmic frames and lenses.

Various embodiments of the present disclosure also cover a unique means of capturing and processing a users face for the purposes of a virtual try-on that balances the need for instant gratification (aka extremely-fast processing) and maximum reconstruction accuracy (which is computationally slower).

BACKGROUND

Users are increasingly using virtual interfaces for shopping for eyewear, rather than visiting physical brick-and-mortar stores. One challenge associated with purchasing eyewear over the Internet involves determining what eyewear will fit the user, and determining how to shape and orient the frames and lens optics specific to the user, without having the benefit of the user being able to physically try-on a physical pair of eyewear or sit for measurement of the user's anatomy. One particular anatomical measurement of interest is pupillary distance, which is the measure between a user's pupils, typically measured in millimeters (mm). Measuring user pupillary distance remotely yet accurately is historically a challenging problem.

There are numerous methods for measuring the scale of an object using pictures and/or a video captured via an image capture device. One solution for remotely measuring pupillary distance during virtual try-on of eyewear glasses has been to instruct users to hold a ubiquitous object of known dimensions (typically a credit card) against their forehead. For example, a user may hold a known-sized object against his face at a location that is as close to the z-plane of their eyes as possible, e.g., the same distance from the camera as their eyes. The user may also attempt to capture an image in which his/her face is positioned orthogonal to a camera, with the known-sized object orthogonal to the camera. Determining scale in such scenarios may involve comparing the ratio of the width of the known-sized object in pixels to the width between the eyes (center of iris or center of pupils) in pixels, then adjusting the scale based on the known width of the known-sized object in millimeters to the measured width of the known-sized object in pixels. This method may be inexpensive and easy for a user to perform. However, it is fraught with measurement error, e.g., if the known-sized object is closer or farther away from the camera than the eyes (or other facial features being measured), the derived scale will be incorrect because the known-sized object will appear a different size than it would if it were at the same distance as the item to be measured. For example, the known-sized object may appear larger relative to the face if closer to the camera, which may result in a scale determination of the face that is too small. Conversely, the known-sized object may appear smaller relative to the face if it is farther from the camera, which may result in a scale determination that will be too large. An assumption of the difference in z-plane can be made, but any deviation from said assumption will introduce an error. Additionally, if the known-sized object is not aligned with respect to the face (or eyes, or other features to be measured), then the scale measurement will also be incorrect. For example, if the object and/or face is not orthogonal to the camera, error can be introduced. Additionally, accurately detecting the corners or edges of a card or magnetic stripe can be difficult on account of the numerous thicknesses (heights) of magnetic strips, and numerous colors & transparencies of credit cards. Furthermore, some users have security concerns associated with the imaging of their credit card (and thus credit card number), and some users may find this process cumbersome, tedious, and/or silly—all of which rightly undermine confidence in the output.

Computational photography/computer vision may rely on estimating eye position by tracking the eye movements (iris or pupil tracking) of users. Sophisticated specialized hardware, e.g., depth sensors, may be employed on mobile devices to provide accurate z-depth measurements, however, it may limit the range of devices on which the solution may be applied. Furthermore, depth data from a depth sensor, alone, may be unable to detect or provide information on the center of a user's pupil. The depth sensor may provide a 3D point cloud data (or a mesh) that corresponds to the smooth curvature of the user's eyeball, but since the pupil has no discernible 3D features, depth information alone may fail to provide the location of the users' pupil. It must be combined with the output of an RGB sensor, and such sensor fusion must be properly pre-calibrated, which is sometimes done at the factory.

Accordingly, there is a compelling need for methods and systems that determine scale via an easy-to-use method that is accurate and fault-tolerant using simple, ubiquitous, inexpensive single-camera RGB sensors, without need calibrate or interrogate the camera's intrinsic and/or extrinsic properties.

Accordingly, it is extremely valuable to create a means of measuring various optical measurements of eyewear frames as worn on patients' faces without the need for inaccurate manual measurement techniques (ruler, marker, pupillometer, etc) or cumbersome digital techniques of measurement that require the use of a clip-on accessory in order to give a simple RGB camera the ability to perceive metric scale and the means to perform pseudo-3D measurement. In the latter case, these clip-on accessories house fiducial markers, each of which is of known metric size, and the spacing between each is of known metric distances. See FIG. 9A for images of two of the most popular commercialized products on the market that leverage clip-on fiducial accessories. While these clip-on accessories, popularly commercialized by ACEP, Optikam, Zeiss, and others, can allow an inexpensive RGB camera to perform optical measurements with acceptable accuracy, the use of these clip-on accessories presents problems of cost, fragility, usability, and customer perception of inaccuracy. There needs to be a means to capture eyewear optical measurements using an RGBD setup, with the depth sensor negating the need for clip-on fiducials due to its ability to solve for metric scale and measure the depth of objects. However, eyewear frames are thin in profile and are often constructed of transparent materials, two scenarios that make them very difficult to accurately resolve with a low-resolution depth sensor. Furthermore, the demo lenses in eyewear frames, while presenting a nice uniform surface from which to measure, are transparent to the wavelength of light used by various depth sensors (whether they be near-infrared emitting light at ~900 nm, or they be Time of Flight (ToF) sensors emitting in the visible spectrum. Described herein are methods to enable common RGBD sensors to accurately image eyewear as worn on a user's face and enable true 3D measurement of the lenses relative to the user's eyes in order to solve for highly-accurate 3D position of wear optical centration measurements, all without the need for a clip-on fiducial accessory. Such a method would be faster, easier, less-costly, and more robust.

Described herein are also further extensions to implementations described in U.S. Pat. No. 11,592,691. In that system, pantoscopic tilt of the eyewear never deviates from the angle set by the manufacturer. However, it is common practice for opticians to manually adjust frames in order to adjust the pantoscopic angle (inclination angles of the temples with respect to the frame fronts when frames are viewed from profile) in order to achieve a better fit for their patients. For faces with prominent cheeks or very low nose bridges, opticans commonly relax the frame's pantoscopic angle in order to ensure the frame sits on the nose and does not contact the cheeks at the bottom of the frame front. Or if a patients ears are unusually low with respect to their eyes, the fame may sit such that the lenses are positioned with a very small or negative pantoscopic angle (with respect to vertical when the head is in a natural posture). Lenses perform best when they are positioned with 5-8 deg of inward tilt (bottom of lens closer to face than top of lens) so as the rotates down to gaze down, the lens remains close to perpendicular to the visual axis. Accordingly, opticians may increase the pantoscopic angle of the frame to improve optical performance for customers with low ears. In order to assist with the remote dispensing of eyewear and delivery of pre-adjusted frames (frames that are adjusted without the customer being physically present), methods are described herein that allow not only the rendering, but the resulting adjustment schematic, to visually indicate if adjustment to the pantoscopic angle is required, and if so by how much.

Described herein is also an improved method of rendering glasses onto an RGB image of a customer's face to provide a virtual try-on that gives a user a better appreciation of the relative size and scale of eyewear to that of their face. When an RGB image capture of a user is done from a sufficient distance away from a camera, rendering of glasses onto the face at metric scale in a physically-accurate matter does sufficiently give the user the perception of relative size for cosmetic purposes. However, if the capture of the face is done quite close to the camera, such as with distance less than 350 mm, the wide angle field of view from the camera, and the resulting perspective distortion of the scene, requires that if the glasses are rendering onto the face at metric scale, the glasses will be perceived by the user to be much larger (wider and taller) than the face, even though the rendering is indeed physically accurate. A shopping experience powered by a virtual try-on using such a system will result in customers rejecting eyewear that is indeed the right size for them cosmetically, and instead select eyewear that is far smaller in size because the smaller eyewear, when rendered by the virtual try-on in a physically-accurate manner taking into account the wide angle field of view of the camera given a close capture distance, will be perceived to be the right proportional size relative to the face. The key is that it will be perceived as such by the user and thus the user will purchase a pair that upon receipt will be rejected as being far too small for their face. Customers assess the relative size of eyewear to their face by looking in a bathroom or try-on mirror, which has an approximate distance of 0.75-1 meter, which is the equivalent of a camera capture of 1.5-2 meters given that when using a mirror (as opposed to direct observation with no mirror), the light travels from the face to the mirror and then bounces off the mirror and returns to the users eye. And indeed, if the same RGB camera that was used for the virtual try-on were used to capture the same physical glasses on the same users face from the exact same capture distance (less than 350 mm) that was used to power the rendered virtual try-on image, the eyewear would appear the exact same relative size to the face—much larger and thus an appropriate relative size. And if the user were to get very close to a bathroom mirror, positioning their face at one half the distance from the mirror as the virtual try-on capture distance, indeed the same glasses on their face would appear to grow to be much larger relative to their face and they would perceive the exact same relative size as the physically-accurate virtual try-on rendering. Another person (or persons) looking at the same eyewear on a users face would make the same conclusion—that the eyewear selected was far too small for the users face—because this second individual(s) again stand more than 1 meter away from the user when judging the cosmetic appearance.

The problem is that customers are not conditioned to think about wide angle perspective distortion when looking at an image of eyewear on their face. Even though a camera capture was taken at a much closer distance than a bathroom mirror, customers view the resulting image and judge relative size of eyewear relative to their face as if it were captured from farther away. So too would other individuals looking at the render of the user—they too would make decisions based on a mental model of viewing from a much farther capture distance than the reality of the image capture. Informing the user of this reality is a sub-optimal solution to this problem, as it puts the metal burden of imagining what they see rendered should in-fact be different when the product is received, and does not inspire the confidence to make an informed purchasing decision.

Described herein is a method to overcome this problem. When a camera capture of a face is done at a short camera distance that would cause this wide-angle field-of-view and resulting perspective mismatch to occur, the rendering system can instead intelligently render a product on a face that intentionally deviate from physical accuracy with the goal of approximating a user's "perceptual reality"—the system will render the frame smaller on the face, deviating from the proper metric scale of the product, so it approximates how it would look had the camera capture been performed at a farther distance from the users face. To do so convincingly requires sophistication in how such scaling were to occur, taking into account the small 7-30 mm proximal distance from the face the frame sits (7-30 mm closer to the camera than the face), as well as the means to distort the temple arms accordingly so as the front of the frame shrinks, the temple arms are intentionally splayed outward the proper amount so they extend properly to the ears of the user in the image. Even within the front frame of the eyewear, uniform scaling down or up of the product would result in the bridge width being too small or large for the users nose, causing unwanted product occlusion with the nose if scaled down or unwanted air gaps with the nose if scaled up—the system would need to preserve the size of the bridge width, yet scale the lens portions of the frame the proper amount to achieve the overall desired width of the front frame relative to the face that achieves the desired cosmetic result, properly accounting for any provided (or derived) camera capture distance.

Such an intelligently 3D distorted frame would only be used for the rendering of frames into a 2D virtual try-on image—it would not be used when performing sophisticated fitting calculations to determine which frames physically fit which users (and which have enough frame adjustability to fit), nor would it be used when calculating individualized 3D position-of-wear optical centration measurements, nor when rendering physically-accurate adjustment schematics that assist opticians in adjusting frames to fit individual customers even if they are not physically-present.

In so doing, the virtual try-on is rendering a product that not only does not physically exist in the real world, but it is rendering a completely novel, customized, and bespoke version of the product that is specific to the eyewear model in question, the 3D face of the user and resulting 3D facial landmarks, the specific capture distance of each image in the virtual try-on (camera extrinsic parameters), and the specific camera intrinsic parameters such as focal length and other distortion parameters. But in doing so, it provides a virtual try-on that better provides the user a sense of which eyewear products cosmetically fit the user (even if they want oversized or undersized frames), such that when the user purchases said frame (or visits a store to see said frame physically prior to purchase), they would claim that what they saw in the virtual try-on indeed matches the reality of what they see when trying the physical product on and looking in a mirror. The resulting business impact is a virtual try-on that results in increased customer confidence (and thereby conversion), higher utilization/engagement, and higher satisfaction (pre and post purchase), all the while delivering a lower return rate.

Described herein is also a means to account for the fact that a camera used for the capture of a user's face may not be positioned at eye level relative to the natural head posture of the user. For example, when a camera is positioned slightly below eye level when performing a capture, the users eyes may be gazing down at the camera (and not fixated at the horizon). The resulting captured image, if used to calculate optical center height either for a pair of glasses physically worn during the capture or used to calculate optical center height for a pair of virtually-fitted glasses to the user (in this case not wearing glasses during the capture), presents the same problem—the eyes are not gazing at the intended height. What is needed, and described herein, is a means to leverage the known or approximated eye center of rotation and knowledge of the precise (up to 6 degree of freedom) camera position relative to the face, to simulate where the eye would be had it been properly gazing off near or far at the horizon.

For a virtual try-on to be commercially successful, a vendor would need to strike a balance between two opposing constraints. On one hand, users do not want to wait to see the results of any preview, but rather want instant gratification—a virtual try-on that is near instantaneous to render. Often this is performed as a live mirror experience, where a live video of the user is displayed with rendered product realistically super-imposed onto the user for each frame of the video. The problem is that to meet the demands of live video, which is often 24 fps or greater, this puts a computational ceiling on the amount of time that a system can spend performing the calculations to fit, render, and display on screen in time to maintain the requirements of live video. Therefore, such a system trades accuracy for performance. On the other hand, customers desire maximum accuracy and fidelity of a system to ensure not just the most realistic rendered preview, but one that delivers the maximum level of precision in the measurement of the user and any resultant optical measurements for the product. Maximum accuracy and rendering fidelity take additional computational resources and time to generate, and thus are not suitable at this time to a real-time live-mirror VTO. Rather, the user must perform a capture, wait for processing to occur, and then view the results in a playback manner.

What is described here-in is a hybrid approach to a virtual try-on and measurement system that does not compromise between the needs for instant gratification and maximum accuracy. The system would provide a live-mirror VTO with real-time results (ensuring the customer does not wait to see initial feedback), and while the user is interacting with the VTO, each subsequent capture is collected and background processed with more sophisticated methods that result in a more accurate 3D reconstruction of the users face. Once a more-accurate result is produced, the live mirror's initially quick-to-compute simplistic representation of the users face can be updated to leverage the now more-accurate reconstruction of the face. It is up to the system and provider to decide if the user is notified that a more accurate result is ready to be leveraged or not—in the latter case, without user notification or input, the updated results can be leveraged and displayed. In one embodiment, purchasing any product can be gated by the user interacting with the system long enough such that the improved accuracy result is completed and leveraged by the system (and user) in their final selection prior to enablement of purchasing functionality.

It is well understood by those familiar in the art, that smart glasses, aka glasses with embedded displays, are not like traditional "dumb" ophthalmic prescription eyewear. The complexities and constraints imposed by the need to embed a display in the lens, as well as display generators, CPUs, antenna, battery, inertial measurement units, etc often in the temples, means that such complicated and sophisticated units are by their definition unable to withstand the degrees of freedom and magnitude of physical adjustments that opticians perform daily to fit traditional ophthalmic frames to best fit their patients' faces. For example, when viewed from above, the angle of inclination of the temple arms relative to the frame front is often adjusted to fit patients with narrow heads by adjusting this angle inwards thereby bringing the ear contact area inwards from floating in air to meeting the patients' narrowed ear location. Conversely, for patients with wide heads, this temple angle is adjusted outwards to ensure the ear contact points do not exert excessive and uncomfortable inward compression. Opticians familiar in the art of ophthalmic frame adjustment commonly perform such adjustments by increasing/relaxing the bend at the shoulder of the frame, or by applying a gradual inwards or outwards curvature to the temple arm down the length of the temple. However, in the case of smart glasses, the temples are thick and rigid (containing the electronic components mentioned above), and often are affixed to the front of the frame at precise angles to allow the display generator to inject a displayed image into the lens such that it is viewed by the user in the proper location. Therefore any eyewear fitting algorithm needs to account for additional frame adjustability constraints imposed by nature of the product being fitted, such as the one listed above and others, and also ensure these constraints are preserved in the generation of any adjustment schematic that would assist an optician or technician in adjusting a frame to fit an individual even if they are not physically present. Described here-in are a few such embodiments.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 is a diagram of an exemplary model for calculating a user's pupillary distance based on detected eye movements of a user, according to one example embodiment;

FIG. 8A-8G illustrate an implementation of an embodiment of perspective correction, and demonstrate the resultant output of the embodiment via side-by-side screenshots that show the system turned on and off for comparison.

FIG. 9A demonstrates popular commercialized methods of leveraging a clip-on accessory possessing fiducial markers to enable an RGB camera to perform optical centration measurements.

FIGS. 9B-9I illustrate various implementations of the ability to measure all 3D optical centration measurements for ophthalmic dispensing leveraging an RGBD sensor and various forms of tape applied to the lens.

DETAILED DESCRIPTION OF EMBODIMENTS

Figure 1:
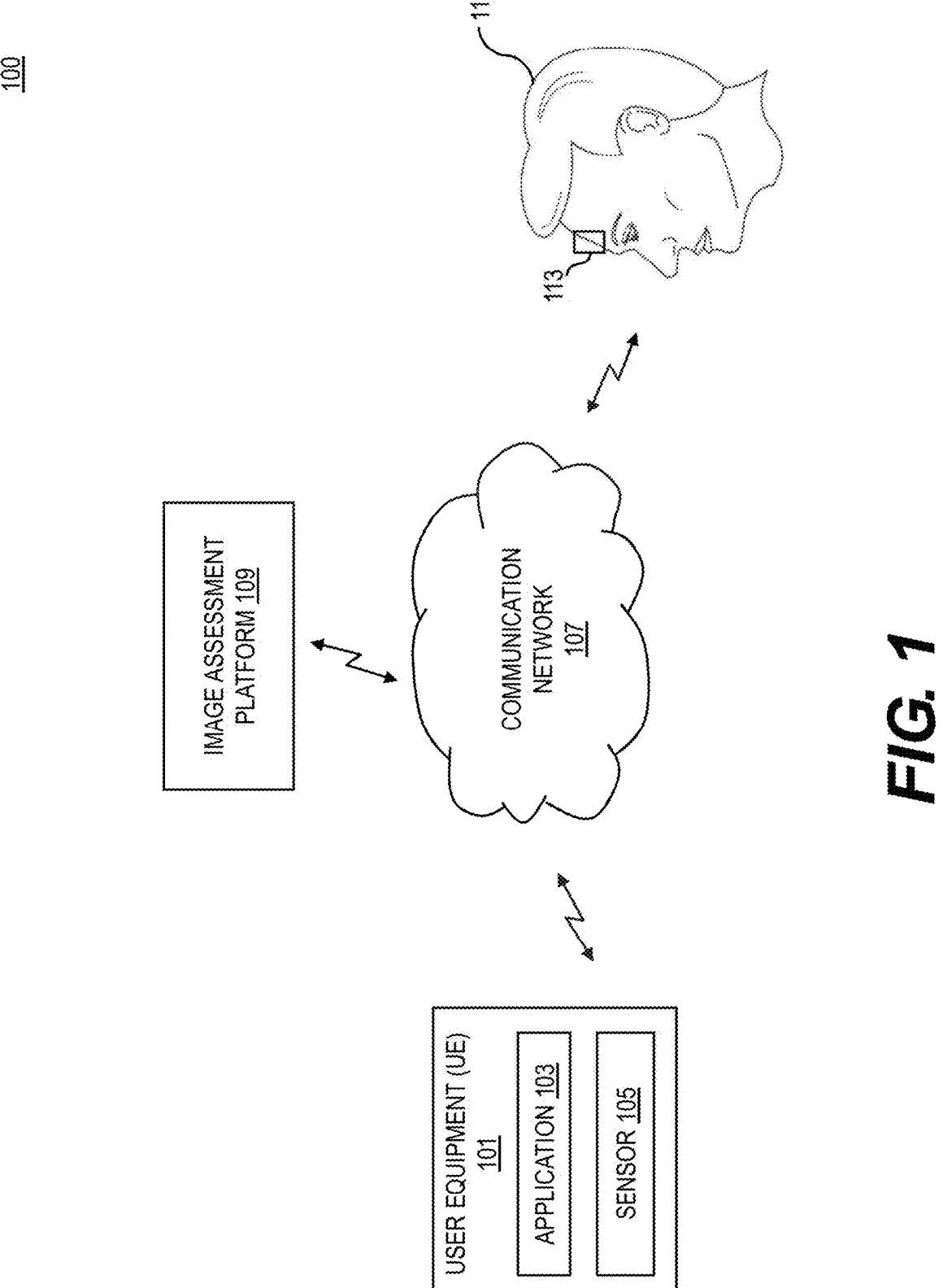
FIG. 1 is a diagram of a system for tracking eye movements of a user to compute pupillary distance, according to one example embodiment.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of the apparatuses, devices, systems or methods unless specifically designated as mandatory. In addition, elements illustrated in the figures are not necessarily drawn to scale for simplicity and clarity of illustration. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment,"

"some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Since users are increasingly using virtual interfaces for shopping they cannot always physically try-on a product. In such circumstances, a "virtual try-on" technique can help a user review how they look while wearing a product. While previewing physical goods via virtual try-on, a desire exists to determine the scale of the scene in which (and objects on which) to superimpose the virtual product (and/or to scale the object being superimposed in the scene and/or on the person). Accurate scaling may permit previewing or rendering the virtual product in a virtual display, with the correct scale. The present disclosure describes new methods for measuring the scale of an object using pictures and/or a video captured via an image capture device.

Furthermore, it may be using techniques known to those in the field that a 3D model can be reconstructed from a single RGB sensor (using various classical computer vision techniques, 3D morphable model (3DMM), refinement of said model via deformation against unstructured point cloud created from techniques such as SIFT, ORB, optical flow, etc., meshing of said point cloud without need for underlying 3DMM, use of techniques such as Neural Radiance Fields, Plenoxels, etc., with or without underlying 3D representation, etc. All of these techniques can build a 3D model of a face with relative degrees of accuracy, however without a pre-calibrated sensor, none of them can properly scale said model. They can estimate or guess, but it is not accurate to power a VTO that is good enough to provide a metric-scale what-you-see-is-what-you-get output, let alone one that can further solve for eyewear fit, 3d position of wear optical measurements, and how to pre-adjust a frame to fit an individual out-of-the-box in order to deliver store-quality outcomes to the home (see previous Varady patent).

To properly leverage such techniques that can build a 3D model, one needs a method to scale said model without need to pre-calibrate an RGB sensor and pre-determine system intrinsic and extrinsic parameters. Some mobile devices and operating systems, thanks to seamless integration of software and hardware (e.g. Apple iOS devices), have had their sensors factory-calibrated and expose sensor intrinsics, extrinsics, and/or lens distortion parameters to developers for use in native applications. However, these devices do not necessarily expose such data to image captures performed via the web browser. Most other devices and operating systems do not supply or expose sensor intrinsics or extrinsics, let alone camera lens focal distance.

And there is a wide variety of different sensor pixel sizes and sensor pixel resolutions, combined with different lens focal lengths and lens designs that result in varying degrees of lens distortion that are currently out in the world across both desktop integrated and external webcams, tablets, phones, etc. One needs a solution that does not first require a typical lens calibration routine performed in computer vision research settings, such as an OpenCV checkerboard pattern imaged from various vantage points, 6 degrees of freedom orientations (with respect to the camera), from various distances across the full field of vision of the sensor. And one needs an approach that avoids the sources of error and usability friction of the typical credit card approach described previously. The system described here-in attempts to do just this.

In one embodiment, system 100 of FIG. 1 may instruct a user to hold a known-sized object directly on the screen just under the camera of UE 101. System 100 may generate a plurality of presentations in the screen of UE 101 instructing the users to look at a first feature of the known-sized object, a second feature of the known-sized object, and into the distance beyond the known-sized object. A vision sensor, e.g., a camera or a webcam, directed at the user may capture short videos or a plurality of images of the users in the same frame as the known-sized object. Since the known-sized object has standard, known dimensions, system 100 may estimate the relative size of the user's anatomy, including pupillary distance, as a function of the measured size of the known object. System 100 may track eye movements of the user from the captured videos and images. System 100 applies a plurality of equations (discussed in detail below) to the captured videos, captured images, the relative size of the user's anatomy, tracked eye movements, or a combination thereof for the scaling of virtually rendered eyeglasses (or captured face model) to enable virtual try-on, i.e., rendering the eyeglasses over a static, moving, or live image of the user, or pre-computed 3D scan of the user.

FIG. 1 is a diagram of a system for tracking eye movements of a user to compute pupillary distance, according to one example embodiment. FIG. 1 depicts an example architecture of one or more example embodiments of the present invention for tracking eye movements of a user for accurate scaling of virtual try-on glasses. FIG. 1 depicts system 100 comprising user equipment (UE) 101a-101n (collectively referred to as UE 101) that may include or be associated with applications 103a-103n (collectively referred to as applications 103) and sensors 105a-105n (collectively referred to as sensors 105). In one embodiment, image assessment platform 109 has connectivity to UE 101 via communication network 107, e.g., a wireless communication network.

As shown in FIG. 1, system 100 comprises UE 101. In one embodiment, UE 101 may include but is not restricted to, any type of a mobile terminal, wireless terminal, fixed terminal, or portable terminal. Examples of UE 101, may include, but are not restricted to, a mobile handset, imaging devices, a wireless communication device, a station, a unit, a device, a multimedia computer, a multimedia tablet, an Internet node, a communicator, a desktop computer, a laptop computer, a notebook computer, a netbook computer, a tablet computer, a Personal Communication System (PCS) device, a personal navigation device, a Personal Digital Assistant (PDA), a digital camera/camcorder, an infotainment system, a dashboard computer, a television device, or any combination thereof, including the accessories and peripherals of these devices, or any combination thereof. In one embodiment, imaging devices may include single lens cameras, multiple lens cameras, depth cameras, depth sensors, laser cameras, infrared cameras, or digital cameras. In addition, UE 101 may facilitate various input means for receiving and generating information, including, but not restricted to, a touch screen capability, a keyboard, and keypad data entry, a voice-based input mechanism, and the like. In one embodiment, the instructions may be displayed in the user interface of UE 101, audio based, or a combination thereof. Any known and future implementations of UE 101 may also be applicable.

UE 101 includes applications 103. Further, applications 103 may include various applications such as, but not restricted to, camera/imaging application, content provisioning application, networking application, multimedia application, social networking applications, media player applications, location-based application, and the like. In one embodiment, one of the applications 103 at UE 101 may act as a client for image assessment platform 109 and perform one or more functions associated with the functions of image assessment platform 109 by interacting with image assessment platform 109 over the communication network 107.

By way of example, sensor 105 may be any type of sensor. In one embodiment, the sensors 105 may include, for example, a camera/imaging sensor for gathering image data, 3D sensors, 2D sensors, an audio recorder for gathering audio data, an ultra-wideband to accurately determine z-distance from one device to another, a network detection sensor for detecting wireless signals or receivers for different short-range communications (e.g., Bluetooth, Wi-Fi, Li-Fi, near field communication (NFC), etc.), and the like. Any known and future implementations of sensor 105 may also be applicable.

Further, various elements of the system 100 may communicate with each other through a communication network 107. The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including 5G (5$^{th}$ Generation), 4G, 3G, 2G, Long Term Evolution (LTE), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof. In one embodiment, communication network 107 may be embedded in a website or application 103 of UE 101, and all the calculations may be performed on the website or in application 103 without the need for communicating with a backend to run the calculations.

In one embodiment, image assessment platform 109 may be a platform with multiple interconnected components. Image assessment platform 109 may include one or more servers, intelligent networking devices, computing devices, components, and corresponding software for tracking points around the eye of the users to improve the accuracy of measurements for pupillary distance. In addition, it is noted that image assessment platform 109 may be a separate entity of the system 100 or the UE 101. Any known or still developing methods, techniques, or processes for tracking points around the eye of the users to improve the accuracy of measurements for pupillary distance may be employed by image assessment platform 109. Furthermore, captured images of the eyes gazing at desired locations can be displayed back to the user, and the user can indicate the center of each pupil in each image.

Figure 2A:
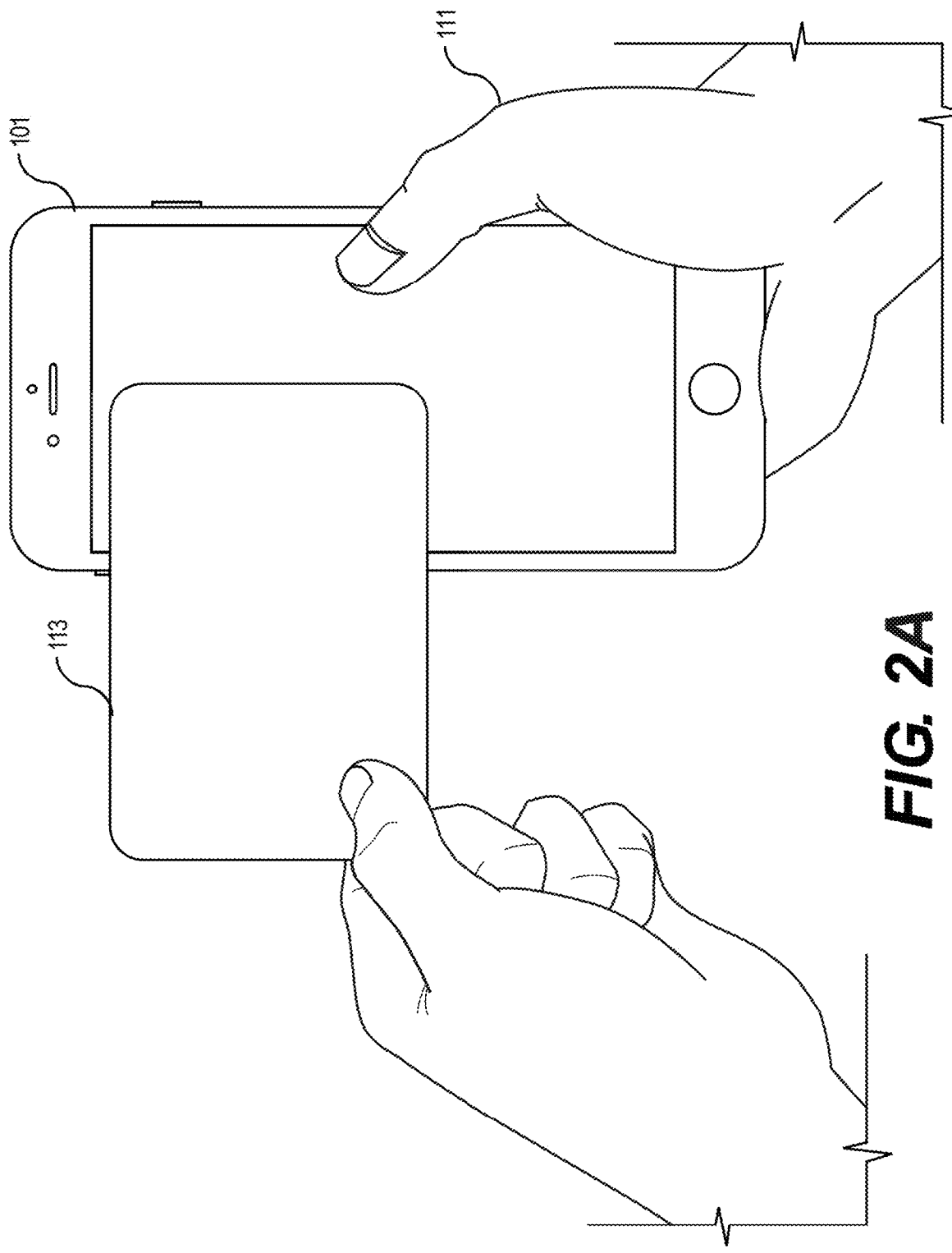
FIGS. 2A-2D are diagrams for tracking a user's pupil or iris using a known-sized object to compute pupillary distance, according to one example embodiment.

FIGS. 2A-2D are diagrams for tracking a user's pupil or iris using a known-sized object to compute pupillary distance, according to one example embodiment. During the process of fitting the eyewear product to user 111, user 111 is instructed to hold the known-sized object 113 (e.g., a credit card) in the same plane as the camera of UE 101 (e.g., against the device's screen or other surface in approximately the same plane as the camera). As depicted in FIG. 2A, user 111 holds known-sized object 113 against the device's screen for scaling. Device 101 may then walk the user through a process of looking at two or more locations of the known-sized object 113 in a manner that allows computation of the user's pupillary distance.

Figures 2B, 2C, 2D:
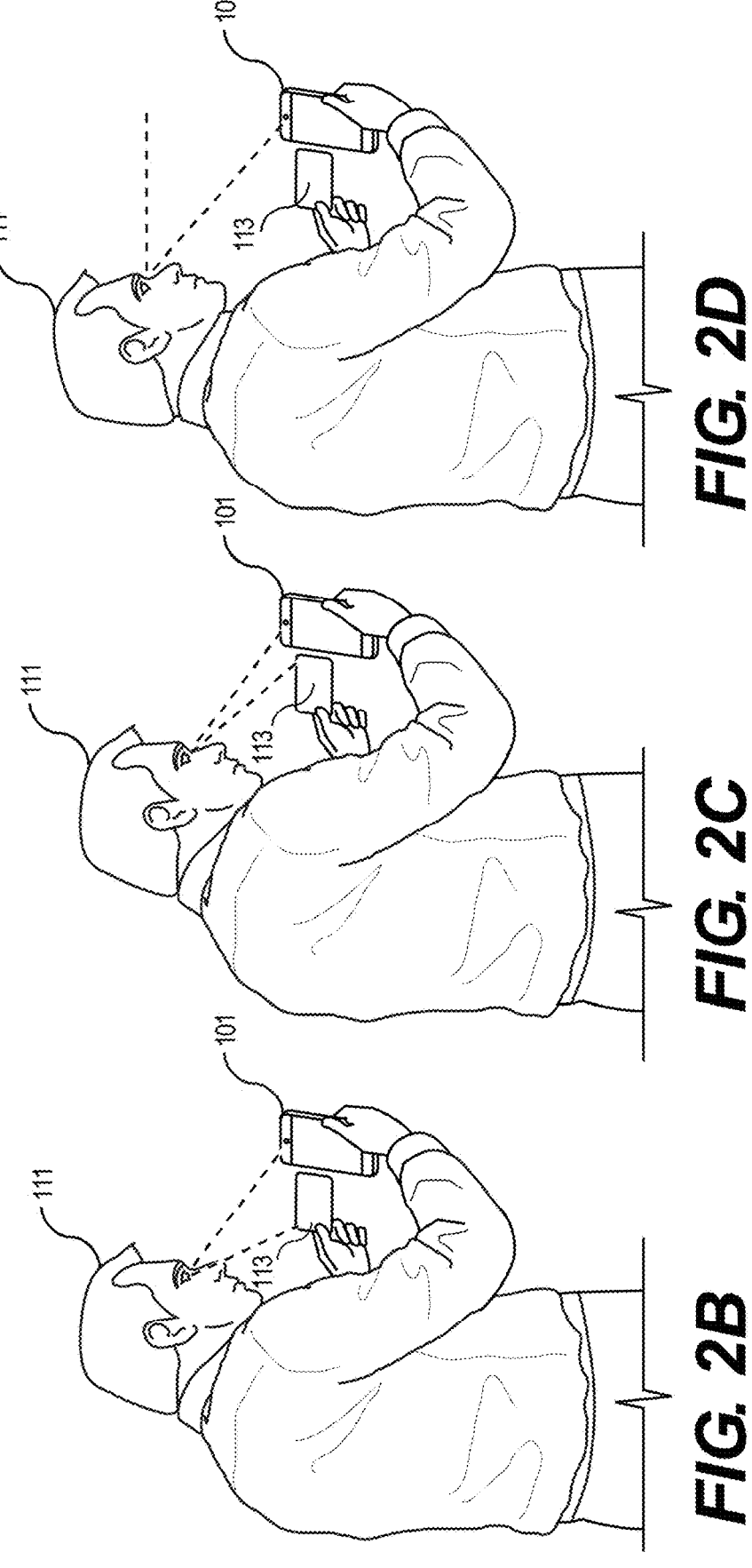

In one embodiment, as described above, image assessment platform 109 may generate an audio/visual notification in the user interface of UE 101 requesting the user 111 to gaze at various locations of known-sized object 113 to enable computation of the user's pupillary distance. For example, in the case of known-sized object 113 being a credit card, then image assessment platform 109 may guide user 111 through gazing at two or more corners of the credit card so as to enable image assessment platform 109 to compute the user's pupillary distance. In particular, as shown in FIG. 2B, image assessment platform 109 may instruct user 111 to look at the top left corner of known-sized object 113. Image assessment platform 109 may then track the center of the pupils or iris as they then gaze at the top left corner. In FIG. 2C, image assessment platform 109 may instruct user 111 to look at the top right corner of the known-sized object 113. Image assessment platform 109 may then track the center of the pupils or iris as they then gaze at the top right corner. In FIG. 2D, image assessment platform 109 may instruct user 111 to look, not at known-sized object 113, but instead straight ahead into the distance (approximated as infinity), e.g., at an object at least 6 feet away (the further away, the better). As user 111 looks into the distance, a ray emanating from the eye to infinity are known to be near parallel to each other, and thus said ray would also extend inwards to the center of eye rotation. The image assessment platform 109 may detect the pupils in real-time. It should be appreciated that while FIGS. 2B and 2C illustrate guiding the user through gazing at the top left and top right corners of a credit card, any other corners of a credit card may be used, and indeed any other known features of a known-sized object may be used for calculating the user's pupillary distance. The larger the object, the more a user must shift their gaze, and thus the more accurate the measurement of pupillary distance (at infinity).

FIG. 3 is a diagram of an exemplary model for calculating a user's pupillary distance based on detected eye movements of a user, according to one example embodiment. Specifically, FIG. 3 depicts calculations between known-sized object 301 and the user's eyes 303, 305. In one embodiment, known-sized object 301, such as a credit card having a width of about 85.6 millimeters (mm) is placed against the screen (just below the camera) of UE 101. The eyes 303 and 305 of user 111 (at an unknown distance from known-sized object 301 and the camera of UE 101) are facing known-sized object 301 and the camera of UE 101. Image assessment platform 109 may generate a first presentation in the user interface of UE 101 instructing the user to look at the top left corner, for example, of known-sized object 301, whereupon system 100 may capture an image of series of images. It can be understood that two imaginary rays extend from the center of rotation of each eye, thru the center of each pupil, and extending straight until each intersects the object being fixated on (i.e., the top left corner of a credit card). Image assessment platform 109 may also generate a second presentation in the user interface of UE 101 instructing the user to look at the top right corner, for example, of known-sized object 301, and system 100 may assume two similar rays extending again from the center of rotation of each eye, through the center of each pupil, straight until they intersect this 2nd desired fixation point (i.e., the top right corner of a credit card). Image assessment platform 109 may also generate a third presentation in the user interface instructing the users to look straight ahead into the distance so that rays extending from the center of rotation of each eye 303 and 305 are parallel to each other. In one example embodiment, when the user is gazing at infinity (an object behind the screen more than 6 ft away, but ideally farther), when measured from the camera of UE 101, the horizontal distance between the centers of the pupils of the eyes 307 is the same as the distance between each eye' center of rotation 309. In one embodiment, during the session, system 100 may track the pupils in real-time. If pupils are hard to detect due to poor lighting or dark colored IRIS, the center of the IRIS can also be used instead of the center of the pupil. Differences between optical axis and visual axis can be optionally compensated for based on average fixed constants being applied, if needed.

In one embodiment, image assessment platform 109 may implement the following equations for tracking the eye movements of user 111:

$$\frac{CCwidth_{mm}}{cameraDistance_{mm} + eyeRadius_{mm}} = \frac{inset_{pixels}}{eyeRadius_{mm}} \qquad \text{Equation 1}$$

Solving for $cameraDistance_{mm}$ $$cameraDistance_{mm} = \frac{CCwidth_{mm} * eyeRadius_{mm}}{inset_{pixels}} - eyeRadius_{mm}$$

In the above equation, $CCwidth_{mm}$ would be the width of the object of known size, and in the case of a credit card, would be 85.6 mm. The equation is a ratio of triangles, e.g., triangles 311 and 313 are ratios of triangles 315 and 317, respectively. In this embodiment, triangles 311 and 313 may represent an inset that defines the eye movements of user 111.

$$\frac{DPD_{pixels} * \text{pixels\_to\_mm}}{cameraDistance_{mm} + eyeRadius_{mm}} = \frac{NPD_{pixels} * \text{pixels\_to\_mm}}{cameraDistance_{mm}} \quad \text{Equation 2}$$

Combining equations 1 and 2 (substituting cameraDistance$_{mm}$ from equation 1 into equation 2), eyeRadius$_{mm}$ is factored out. Solving for pixels_to_mm:

$$\text{pixels\_to\_mm} = \frac{(CCwidth_{mm} * DPD_{pixels}) - (CCwidth_{mm} * NPD_{pixels})}{DPD_{pixels} * inset_{pixels}} \qquad \text{Equation 3}$$

$$DPD_{mm} = DPD_{pixels} * \text{pixels\_to\_mm} \qquad \text{Equation 4}$$

$$DPD_{mm} = \frac{(CCwidth_{mm} * DPD_{pixels}) - (CCwidth_{mm} * NPD_{pixles})}{inset_{pixels}} \qquad \text{Equation 5 (combining Equations 3 \& 4)}$$

In this example embodiment, the pupillary distance at infinity (DPD$_{pixels}$), e.g., DPD 319, is the distance between the center of the pupils in pixels when viewing a distant target, e.g., user 111 looking into infinity. cameraDistance$_{mm}$ is the distance to the surface of the eyes in mm from known-sized object 301 placed at same distance as the camera of UE 101 (or close enough so as to not affect accuracy of the measurement significantly). Near PD (NPD$_{pixels}$) is the distance between the surfaces of the pupils when viewing a near target in pixels, e.g., user 111 looking at the edges of known-sized object 301.

As can be seen above, in Equation 5, one can solve for DPD$_{mm}$ by knowing the distance of known size of a credit card (or other object) in mm, the distance between pupils in pixels when focused at infinity, the distance between pupils in pixels when focused at one of the two corners of the credit card, and the inset in pixels at the surface of the eye between the two images of the eyes focused at each corner of the credit card (how much each eye moves in pixels between the two fixation points).

In the above equations, the object of known size is assumed to have negligible thickness (like that of a credit card), otherwise the thickness of the object of known size would have to be taken into account though a simple application of trigonometry.

Key in the above embodiment is that the object of known size does not move relative to the camera during the duration of video/image capture (as the user looks at one corner of the credit card, the other corner of the credit card, and off at an object far away approximating infinity.

FIGS. 4A-4D are user interface diagrams that represent presentation of instructions to the users for detecting eye movements, according to one example embodiment. In one embodiment, image assessment platform 109 may enable a presentation of a graphical user interface (GUI) in a UE 101 associated with the users. Image assessment platform 109 may employ various application programming interfaces (APIs) or other function calls corresponding to the applications on UE 101, thus enabling the display of graphics primitives such as icons, menus, buttons, data entry fields, etc., for generating the user interface elements. This interface (and resulting calculations) can be implemented as a native application, or implemented entirely in a web browser. In another embodiment, image assessment platform 109 may cause interfacing of the guidance information with the users to include, at least in part, one or more annotations, scripts, text messages, audio messages, video messages, or a combination thereof. Still further, image assessment platform 109 may be configured to operate in connection with augmented reality (AR) processing techniques, wherein various applications, graphic elements, and features may interact. In one example embodiment, image assessment platform 109 may comprise a variety of interfaces, for example, interfaces for data input and output devices, referred to as I/O devices, storage devices, and the like. In another example embodiment, image assessment platform 109 may implement a conversational user experience "UX" that presents one or more automated interfaces to the user and learns about the users based on information supplied by the user to the automated interface. In one embodiment, image assessment platform 109 may organize, automate, and synchronize user information to provide improved assistance and a personalized user experience.

Figure 4B:
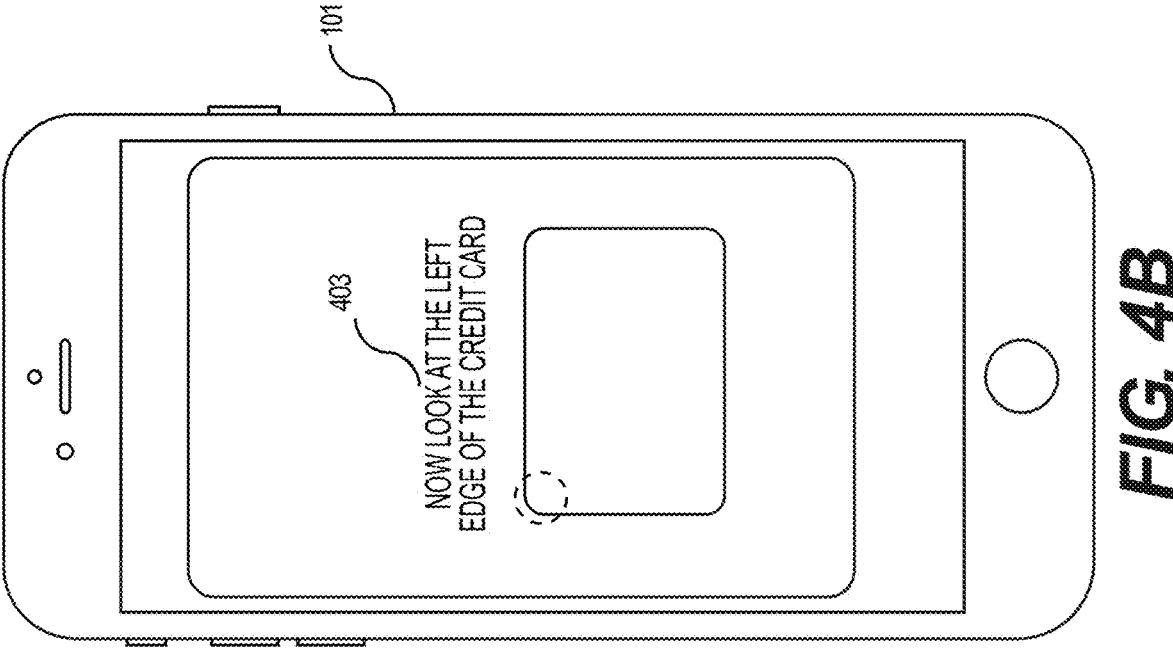
FIGS. 4A-4D are user interface diagrams that represent presentation of instructions to the users for detecting eye movements, according to one example embodiment.
Figure 4A:
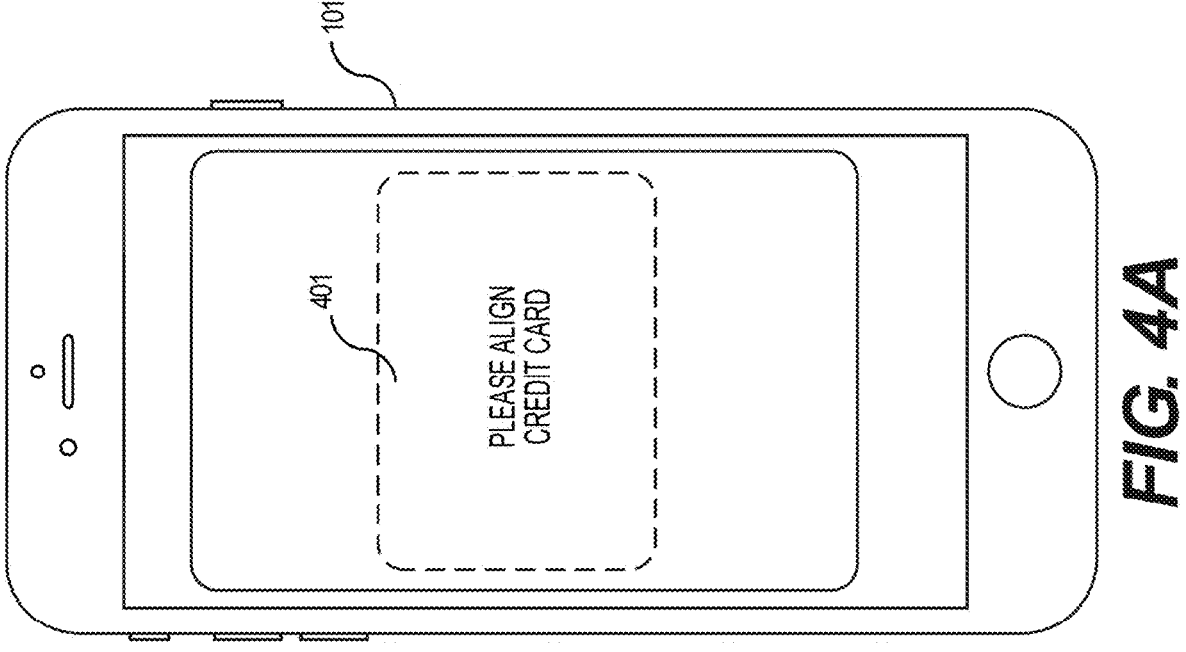
Figure 4D:
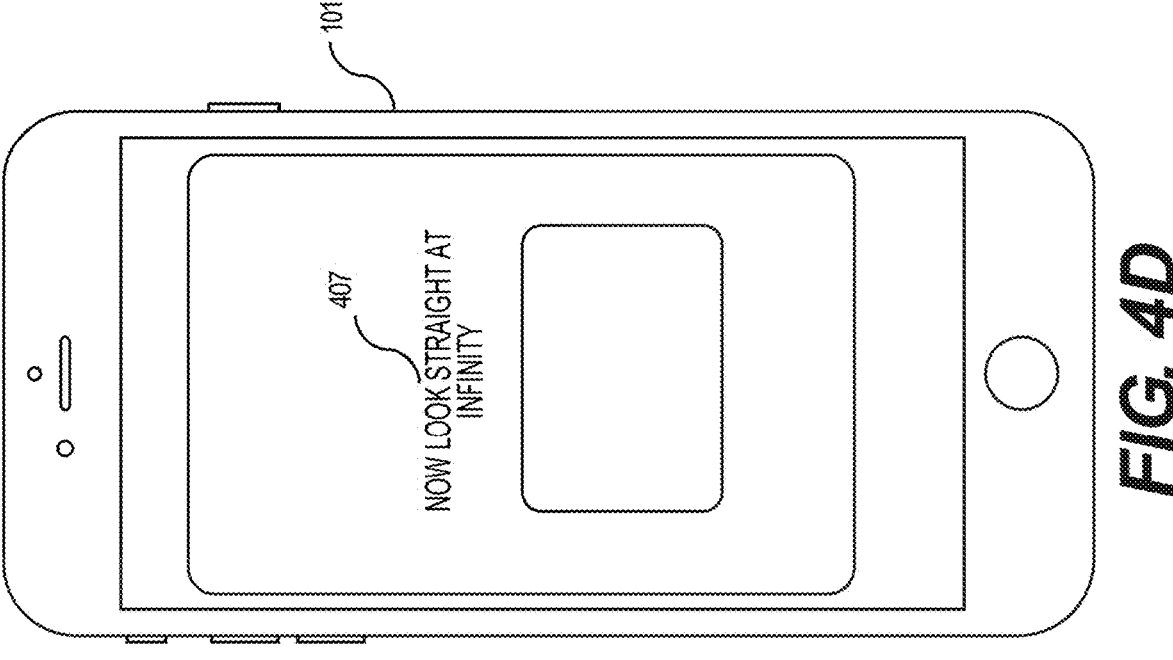
Figure 4C:
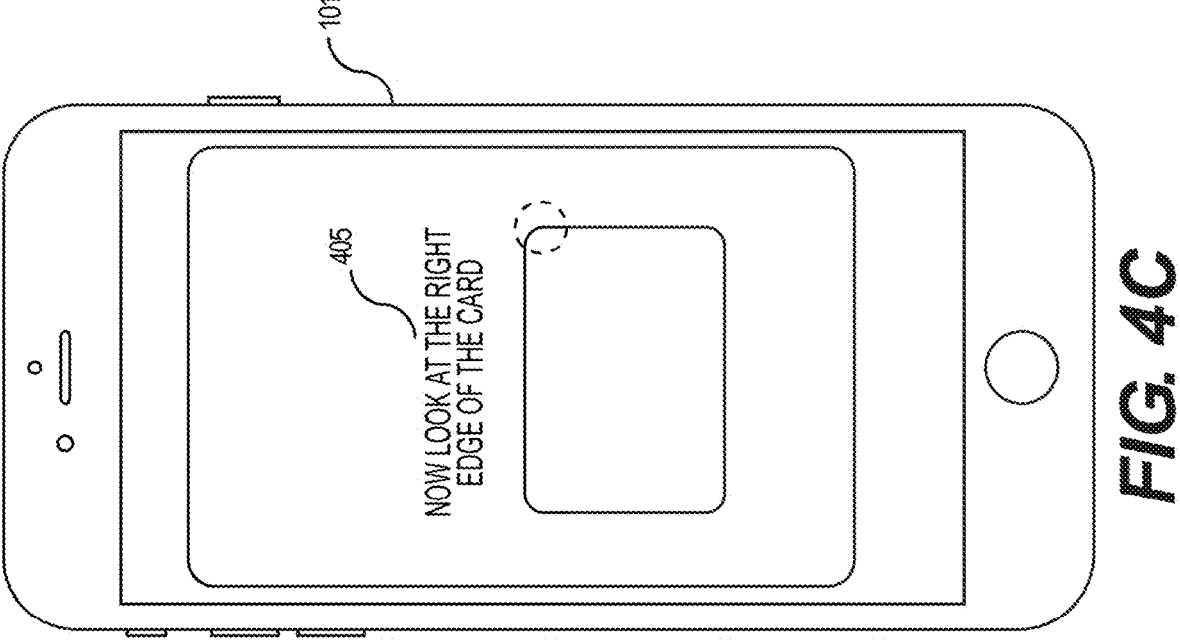

In FIG. 4A, image assessment platform 109 may instruct a user to align known-sized object 113 within display 401 of UE 101. In one embodiment, known-sized object 113 does not need to be placed at the center of the display—it may be placed at the edge of the screen. Once user 111 properly aligns known-sized object 113 within display 401, image assessment platform 109 may generate display 403 with audio notifications to instruct user 111 to look at the left corner or edge of known-sized object 113 (FIG. 4B). Similarly, image assessment platform 109 may generate display 405 with audio notifications to request user 111 to look at the right corner or edge of known-sized object 113 (FIG. 4C). Furthermore, image assessment platform 109 may generate display 407 with aural instruction recommending user 111 to look not at known-sized object 113 but straight ahead into the distance, e.g., at an object over 6 feet away (approximating infinity, as shown in FIG. 4D).

Figure 5B:
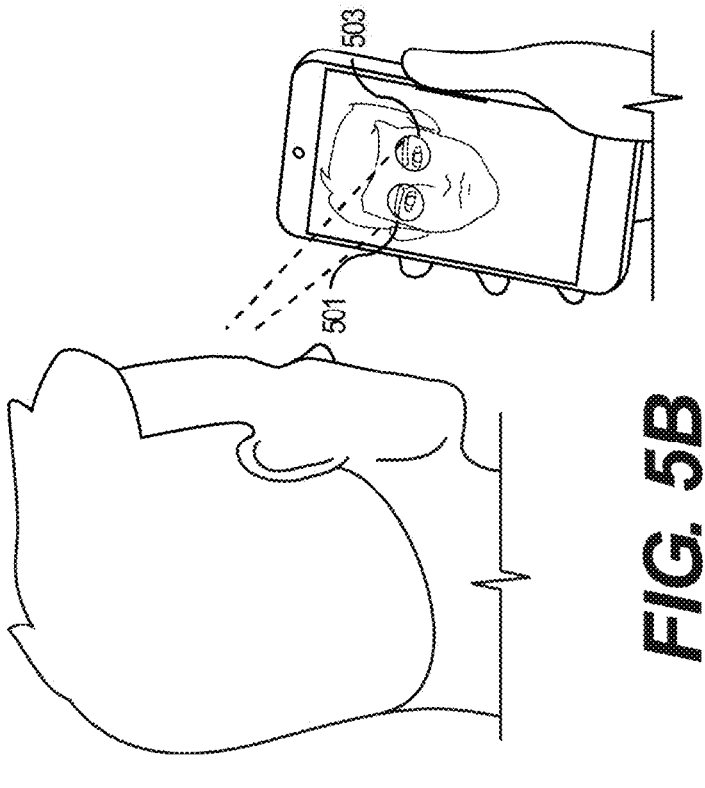
FIGS. 5A-5B are user interface diagrams that illustrate an alternative embodiment of the invention involving generating a multi-point display for inducing a user to gaze at multiple points of the display for estimating the user's pupillary distance, according to one example embodiment.
Figure 5A:
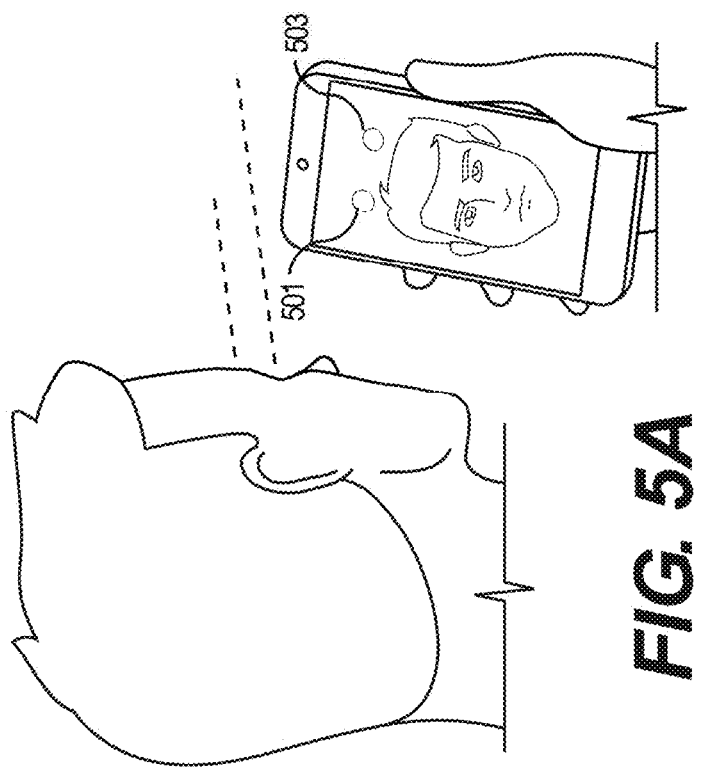

FIGS. 5A-5B are user interface diagrams that illustrate an alternative embodiment of the invention involving generating a multi-point display for inducing a user to gaze at multiple points of the display for estimating the user's pupillary distance, according to one example embodiment. In particular, upon determining the pixel pitch of a given electronic display screen, a user's pupillary distance can be calculated in the manner described with respect to FIG. 3, upon instructing the user to gaze at two or more of the displayed points on the screen, as well as gazing into the distance. In one embodiment, image assessment platform 109 may first look-up or otherwise determine the pixel pitch of the screen of UE 101. In one example embodiment, pixel pitch may be the distance in millimeters (mm) from the center of a pixel to the center of the adjacent pixel. Since pixel pitch indicates the amount of space between two pixels, a smaller pixel pitch equates to higher pixel density and improved screen resolution. Pixel pitch is important because it influences the optimal viewing distance for a display, but more importantly, it is critical if the display is to guide a user to gaze at objects of known distance apart, that distance be in metric scale. Or alternatively, if the overall width of the screen is known (and not the pixel density of the screen), the system can guide the user to simply look at the corners of the screen.

In FIG. 5A, image assessment platform 109 may generate a presentation of two or more indicia, e.g., dots 501 and 503 in the user interface of UE 101. The camera of UE 101 may capture the face of user 111. Thereafter, the user may move his head and eyes to confirm that the two dots 501 and 503 tracks the eyes (as depicted in FIG. 5B). In one embodiment, the wider the dots, the further the user may be positioned from the camera during the tracking activity. For example, if the user performs the tracking activity from a distance, the detected eyes movement is larger if the targets are farther apart, and hence the error in determining the center of the eyes is lower. However if the sensor resolution is low, and/or the object of known size is not very wide, or a combination therein, the system can guide the user to position themselves closer to the screen so more pixels are used to measure distance between eyes (and properly differentiate slight eye movement as the user gazes at different targets). As opposed to the user standing too far from the camera and if the centration is off by a pixel, then it has a much larger adverse effect on accuracy.

One major advantage of this approach is that the object of known size (aka a credit card) is not visible to the camera, avoiding privacy or fraud concerns.

The system can also use known computer vision techniques, face detectors, and face yaw/pitch/roll estimators to guide the user (via audio or visual prompts) into a proper orthogonally facing the camera prior to the capture sequence. Facial yaw at zero degrees is most important, such that the left and right eye z distance from the camera can be assumed to be at the same value.

The system can auto-detect the center of pupils or IRIS using computer vision techniques well known to those in the field of computer vision and/or deep learning. Or the system can present captured images back to the user and ask them to click the center of the pupils or iris. Or a combination of the two—the system can auto-detect, but then ask the user to confirm/refine the result prior to calculation of the PD.

In a simplistic implementation, one can make the assumption that the user's head is perfectly fixed/static during the time it takes to gaze at three points. However, in reality, since the capture sequence is likely to occur over the course of 3-8 seconds, it is likely that the user's head will have drifted slightly in 6 degrees of freedom (X, Y, Z, pitch, yaw, roll). However, one can use the detected center of one eye in one gaze position as a reference point from which to align all subsequent image captures such that face translations in X and Y, as well as face pitch and roll, are properly compensated, and such error that would otherwise be introduced is removed. Furthermore, using techniques known to those familiar with computer vision techniques (optical flow, SIFT matching, standard or trained face detection and tracking systems, etc.), the system can track a multitude of points on the face that do not move with respect to pupils (e.g. points around the eyelid, on nose, eyebrows, mouth, ears, etc.), and then use the distance between these points to further account for changes in Z (camera-to-face distance) during the capture, as well as face yaw (turning head left/right). Implementing this relative coordinate system and facial point tracking can aid in improving overall system accuracy while being tolerant of small amounts of facial movement.

Determining distance PD via this system is in of itself quite valuable in enabling the dispensing of single vision lenses for eyewear frames. Furthermore, nearPD is also solved via this system, but this nearPD is the distance between the centers of the pupils or IRIS when they converge at the solved camera distance. It is likely that to improve the accuracy of the system, the ideal camera distance used in this described measurement technique is closer than that used for typical nearPD measurements (usually 35 or 40 cm). However, using well-understood geometric constraints that include leveraging the eyes' center of rotation, one can use distance pupilar distance (DPD) to solve for surface-of-the-eye nearPd at any desired convergence (aka reading) distance. Furthermore, using an assumption of eyewear vertex distance, or better an actual eyewear-specific vertex based on fitting simulation or a previous physical measurement of vertex, one can solve for nearPD on the back surface of the as-worn eyewear, at any desired reading distance.

Beyond solving for distance PD and near PD, such a system can also be used to solve for the scale of a previously-reconstructed, or soon-to-be-reconstructed, 2D or 3D model of the patients' face. There are many such methods for 2D or 3D reconstruction of a face, even from a single RGB sensor: a) classical computer vision or deep learning techniques that detect/track eyewear landmark points in a single image or series of images, b) methods that leverage a 3D morphable model (3DMM), c) methods that refine said 3DMM via an unstructured point cloud of points determined from techniques such as SIFT, structure from motion, and bundle adjustment, d) Neural Radiance Fields, Plenoxels, or other such related techniques (with or without an underlying 3D representation), etc. All of these techniques can, with various degrees of accuracy, reconstruct a face in 2D or 3D. However, these methods described cannot solve for the scale of the object being reconstructed without an accurate measurement of camera distance or an accurate camera intrinsic matrix. This system not only provides camera distance to the surface of the eyes (and the metric distance between them), but by extension any other detectable/trackable points on the face at the same Z distance—all without knowledge of precise camera calibration which can include camera intrinsics, extrinsics, and lens distortion. Once the distance between said points is known, one can scale a 2D or 3D model of the face until the same points on said reconstructed face is the same scale. Multiple points can be measured, and the scaling can be done to best fit the result by minimizing the resulting errors or deviations for each measurement. Scaling a face using points that are not part of the moving eye system (center of pupils or IRIS) is valuable b/c in the reconstructed face these features may not be focusing at infinity, but instead converging at an object of known size.

However, other points on the face at the same camera distance (such as inner or outer eyelid points, etc.) do not move relative to each other as eyes focus close or far, and thus are ideal for use in scaling between the two systems.

To enable the optical centration measurements of a user wearing eyeglasses using an RGBD sensor such as the Apple TrueDepth sensor common on iPhones and iPads that powers FaceID, one must first make the lenses visible to the depth sensor. The use of various forms of tape applied to the front surface of one or both lenses achieves this goal. Herein we describe two approaches: a 1-scan approach that does not require as a pre-requisite a 3D face scan of the patient, and a 2-scan approach that requires as a pre-requisite a 3D face scan of the patient without wearing glasses prior to a $2^{nd}$ scan of the patient wearing glasses.

To make the 1-scan approach work, the tape that is applied to the lenses must be transparent to the visible spectrum, so the RGB camera can see the eyes through the tape, but opaque in the near-infrared spectrum so the infrared light used by the depth sensor (~900 nm) resolves the surface of the tape.

Figure 9B:
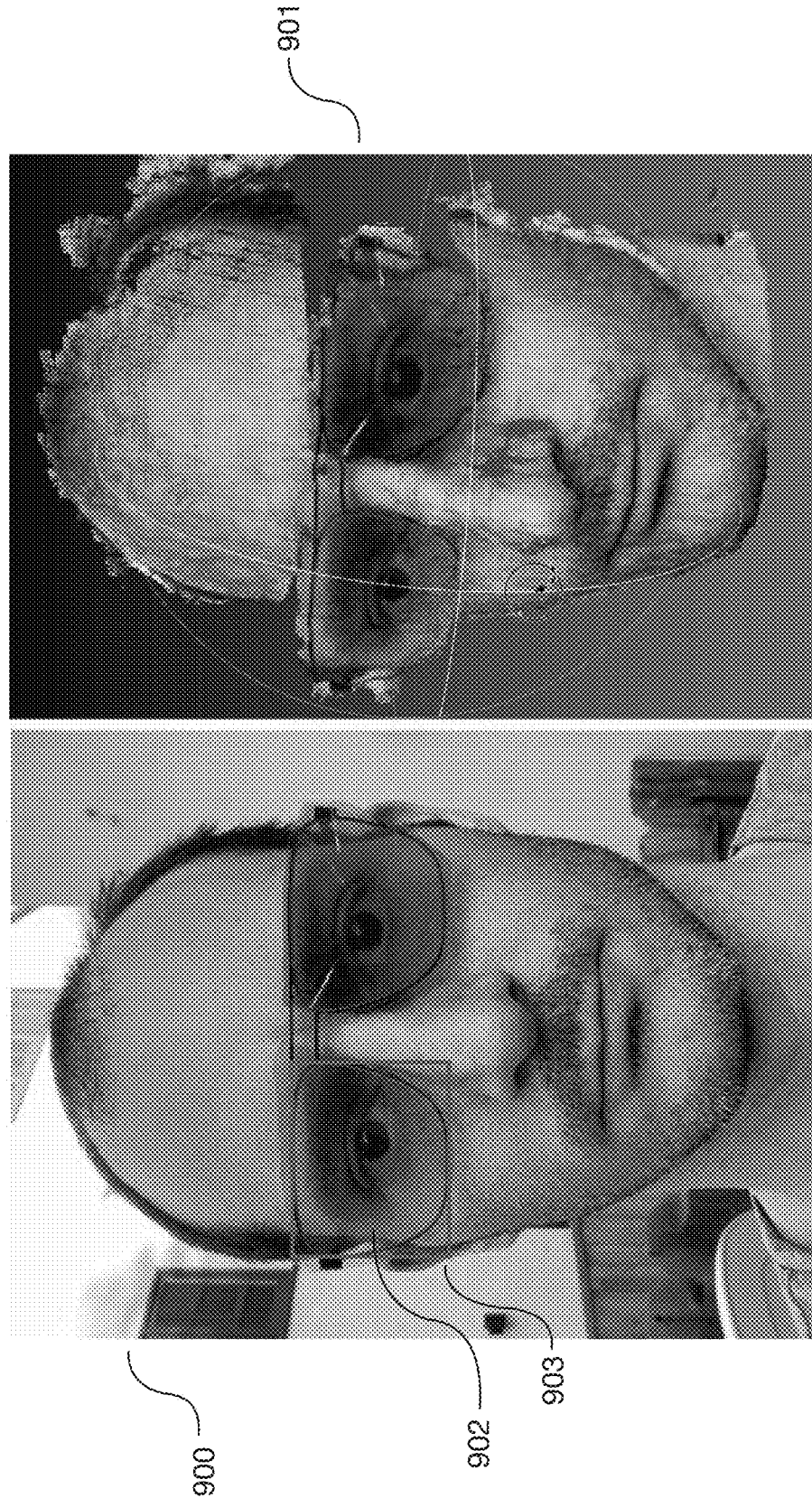

As shown in FIG. 9B, image 900 shows the RGB image capture of a face wearing glasses in which such a special tape 902 (transmissive in the visible spectrum but opaque in the near infrared spectrum) is applied to both lenses. The lens on the left has a thinner tape applied, while the lens on the right has a thicker tape applied. Though FIG. 9B shows both lenses covered by tape, for the system to function only one lens should be covered with tape. Image 901 shows the resulting colored 3D point could that is created from this single RGBD image captured. As one can see, the tape's special properties allow the eyes to be visible through the tape (as also evidenced by the ability to see the eyes though the tape in image 900), but the 3D shape of the tape (and thereby the lens) is properly resolved. FIG. 9H walks though a flow diagram of this 1-scan system embodiment. As mentioned previously, 950 discusses that the tape should be applied to only one lens. Post-capture, the RGB image should be displayed back to the user (step 951) with UI to let them box the lens, which is a common practice well known to opticians—they draw or position a box around the outer edges of the lens. Such a box is shown as 903 in FIG. 9B. The system then performs step 952, which is the fitting of a sphere to the 3D points contained inside the box. To assist in this step, the system may optionally perform various statistical outlier rejection techniques to remove noisy outliers in the point cloud. The system then uses the mathematical equation of this fitted 3D sphere to look up the 3D coordinates of any desired 2D point in the RGB image in the box region, such as the borders of the box (step 953). In step 954, the system detects (or is provided) the 2D coordinates of the patients' eyes in the captured RGB image. The system may present UI to allow the user to identify these 2D locations, and/or the system may leverage techniques known to those familiar with the art to auto-detect the eyes in the images using traditional computer vision or deep learning techniques (and optionally have the user confirm these results before proceeding). In Step 955 the system then determines the full 3D position of the eye-without-tape by looking up the 2D coordinates of said eye in the corresponding 3D point cloud and returning the proper Z value. This step may leverage the nearest point in the point cloud to the desired 2D coordinate, or interpolate amongst the nearest point clouds to find a 3D coordinate that may lie in-between them (essentially meshing the point cloud in this region). Then in step 956, the system applies the same Z value of the eye-without-tape to the eye that is behind tape, as the z-value of the eye-behind-tape in the point cloud is on the lens thanks to the special properties of the tape, as can be seen in 901 in FIG. 9B. In step 957, the system may optionally un-converge the x-value of the eye (moving eyes outwards) to account for the gaze location of the user during the moment of capture. If the user was instructed to focus on the capture-device, the capture device's screen, or the capture device's camera (or any object close), then the eyes are converged near in the RGB image and to properly determine pupillary-distance at a gaze of infinity the system would need to un-converge the eyes by leveraging input from a previous scan of the user gazing at infinity, or input from a pupillometer, or from a mathematical unconverging of the eye leveraging the understood kinematics of the eye as each rotates to focus from close distance to infinity. In this instance, the camera capture distance is known thanks to the use of the depth sensor, and this can be used as input into this calculation to properly unconverge the eyes. In step 958, now that a mathematical spherical representation of the front surface of the lens is known, as well as the 3D coordinates of inner-most point on the lens and lowest point on the lens, and the 3D coordinates of each eye, full 3D position of wear optical centration measurements can be calculated. The center of the eyewear can be demined by calculating the middle line or plane between the two boxed lenses, and this can be used to calculate monocular pupillary distance (both near and far), monocular optical center height, vertex distance (distance from the surface of the eye to the back surface of the lens—here an assumption or known thickness of the lens can be used to offset the front sphere surface to achieve a back-sphere surface), pantoscopic tilt angle, and wrap angle of the frame. The definitions of pantoscopic tilt angle and wrap angle are well known to those familiar in the art of dispensing ophthalmic lenses, and the trigonometry to calculate each, leveraging a mathematical representation of the front surface of the lens (as constrained by the box coordinates), is rather straightforward. In addition to full 3D position of wear measurements, the system can also use the box coordinates to return standard frame measurements of A (lens width), B (lens height), and DBL (bridge width). The system can also take into account desired bevel offsets when calculating A, B, DBL, and OC height. As noted in Figure H, step 954 can optionally occur earlier in the process than discussed—it can occur as soon as step 950 is complete. As soon as capture step 950 is complete, the disposable tape applied to the customers' lens can be removed and discarded.

The advantages of the 1-scan approach are that a pre-existing full 3D face scan is not required. But the downside is the extra expense in sourcing said special tape (but as demonstrated in FIG. 9B, such tape can be sourced). Furthermore, without a full 3D face scan, the ability to cater to this customer remotely with subsequent purchases (such as via e-commerce) is lost. A 2-scan approach, described below, leverages a pre-existing full 3D face scan of the user, but in so doing can function with a much cheaper form of opaque tape: 3M scotch magic tape, masking tape, washi tape, etc are all suitable for this embodiment.

The 2-step embodiment is quite similar to the 1-step, but with a few important differences, as diagramed in FIG. 9I. To start this process, one must first capture a full 3D scan of the patient's head without the patient wearing any eyewear. There are a number of advantages to capturing the full 3D head of the patient (subsequent use in e-commerce), but in the case of the 2-step embodiment, the main advantage is that the 3D position of the eyes are provided not from the RGBD tape scan, but from the 3D face scan that is auto-aligned to the tape scan.

Figure 9C:
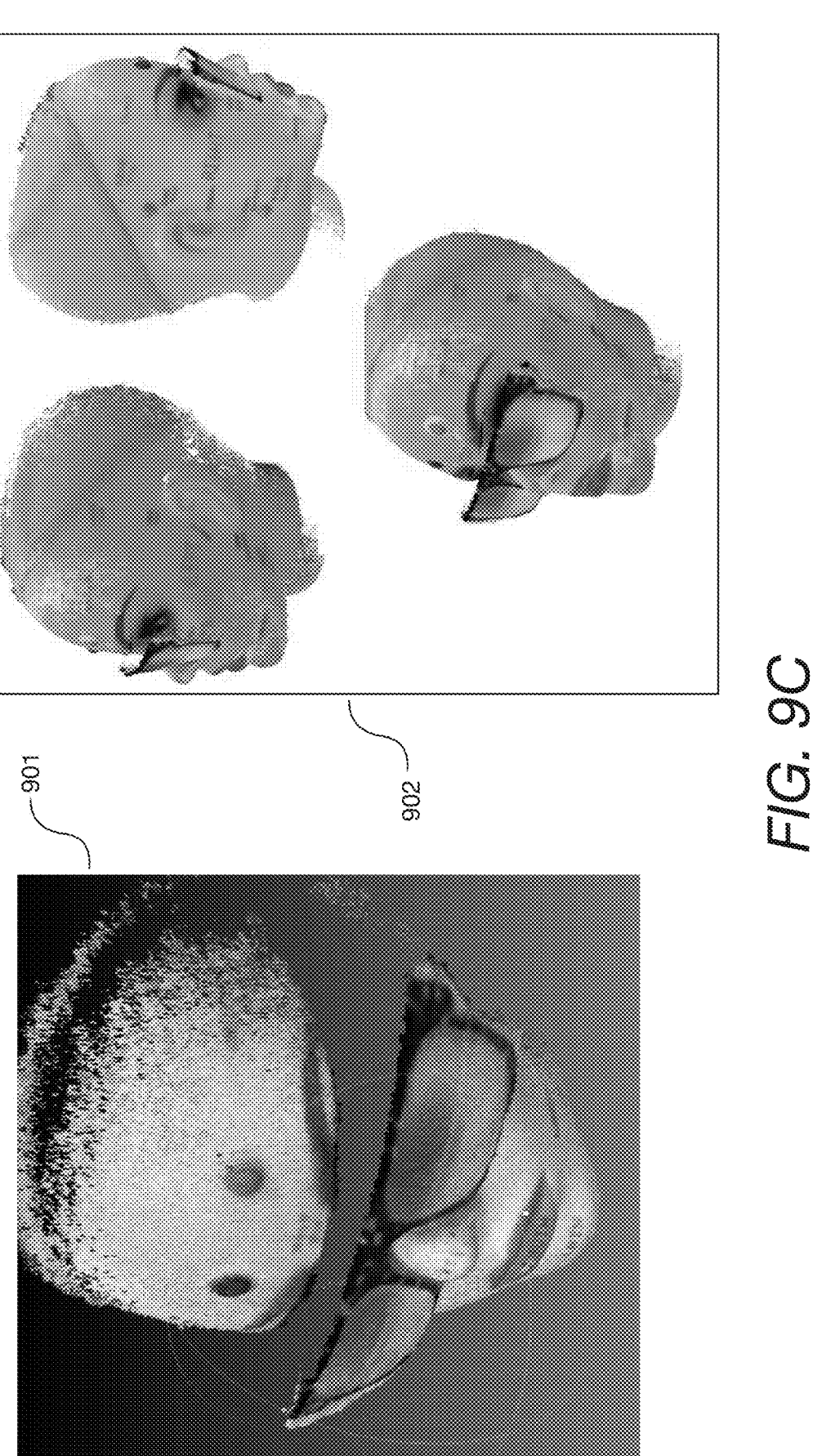
Figure 9D:
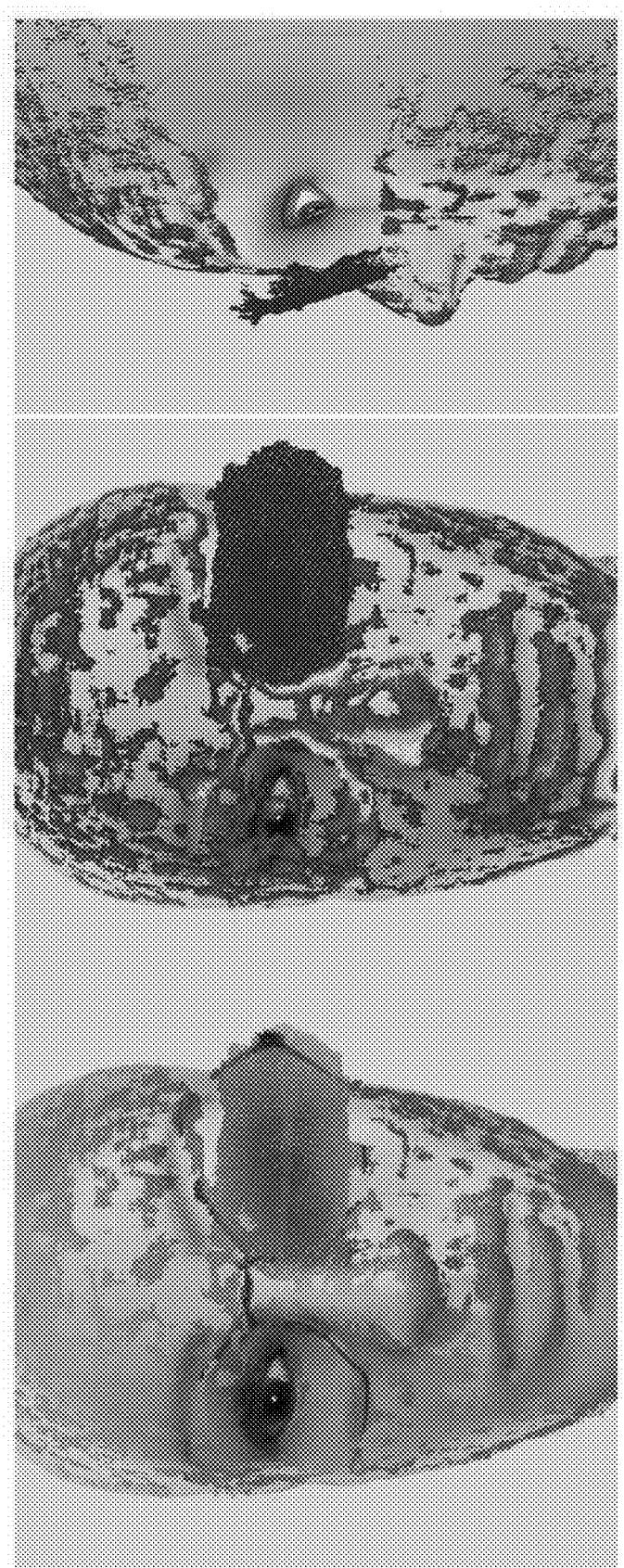

Step 960 calls for the capture of the patient's full face scan without the presence of glasses on the face. Then a piece of opaque tape is applied to one or both lenses (step 961) and an RGBD capture is performed. In step 962, unique to this embodiment, the pre-existing 3D face mesh from step 960 is auto-aligned to the 3D point cloud of the RGBD tape capture from step 961 using techniques known to those familiar in the art of 3D mesh and point cloud alignment, such as by leveraging Iterative Closest Point (ICP) optimization. FIG. 9C, image 901 shows the 3D point cloud that is created from the RGBD tape capture—notice how the eyes are completely obstructed by the tape. In this example, tape is applied to the entirety of both lenses, but in actuality, by using sophisticated sphere fitting and outlier rejection algorithms, the tape can comprise a small percentage (~30%) of the lens's total area. For example, a piece of 3M Scotch magic tape, typically 0.75" in width, cut to approximately the width of the lens and positioned centered both horizontally and vertically on the lens, provides ample surface area for this embodiment to properly function. FIG. 9C image 902 shows various views of the point cloud after it has been auto-aligned to a previously-captured full face scan. Note that the eyes are now visible in the combined 3D space, as are the ears—both provided by the full face scan. In FIG. 9D you can also see the result of ICP alignment between the previously-reconstructed 3D face of this mannequin and the recently-captured single RGBD tape image capture.

Step 963 is similar to step 951 in the 1-step embodiment. Step 964 is also quite similar to step 952 in the 1-step embodiment, but with one additional advantage—the system can leverage the aligned 3D face scan to further aid in outlier rejection/cleanup of the point cloud created by the RGBD tape scan. For example, any points in the point cloud within a fixed distance to the 3D face mesh (say 1 mm) can be removed, as the points we care about are on the lens which is guaranteed to be more than 5 mm away from the face (though possibly a bit closer near the cheeks and nose, but even if points were eliminated in these regions, the sphere fitting will still function and extend the mathematical representation of the lens surface all the way to the borders of the boxed lens). Step 965 is similar to step 953. In step 966, the 3D coordinates of the eyes are known and leveraged from the full 3D face scan. Step 968 is similar to step 958—all information is know known to perform full 3D position of wear optical centration measurements, as well as return the frame measurements (A, B, & DBL). Once step 961 is complete, the disposable piece of tape that was applied to the lens can be removed and discarded.

Figure 9E:
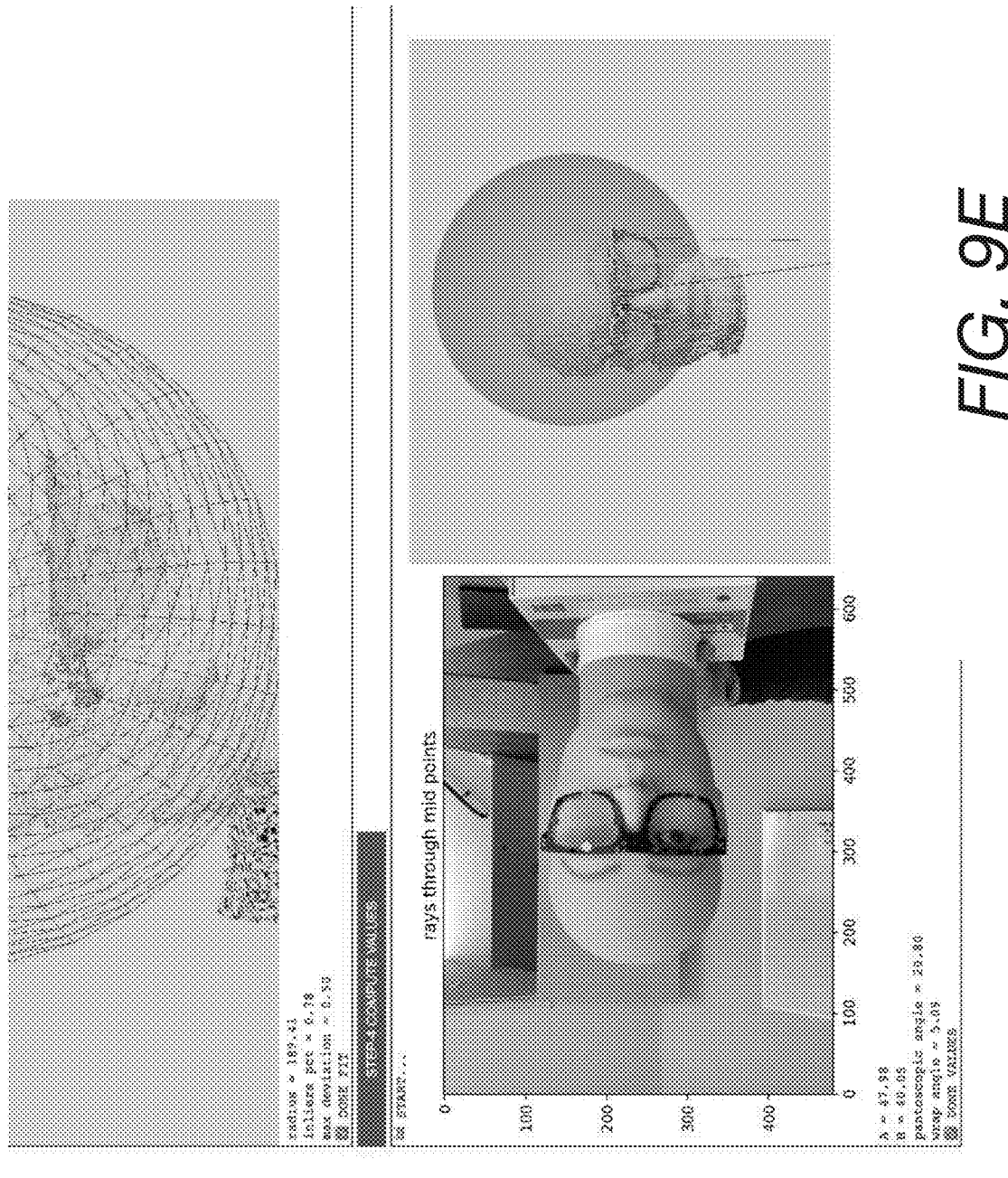
Figure 9F:
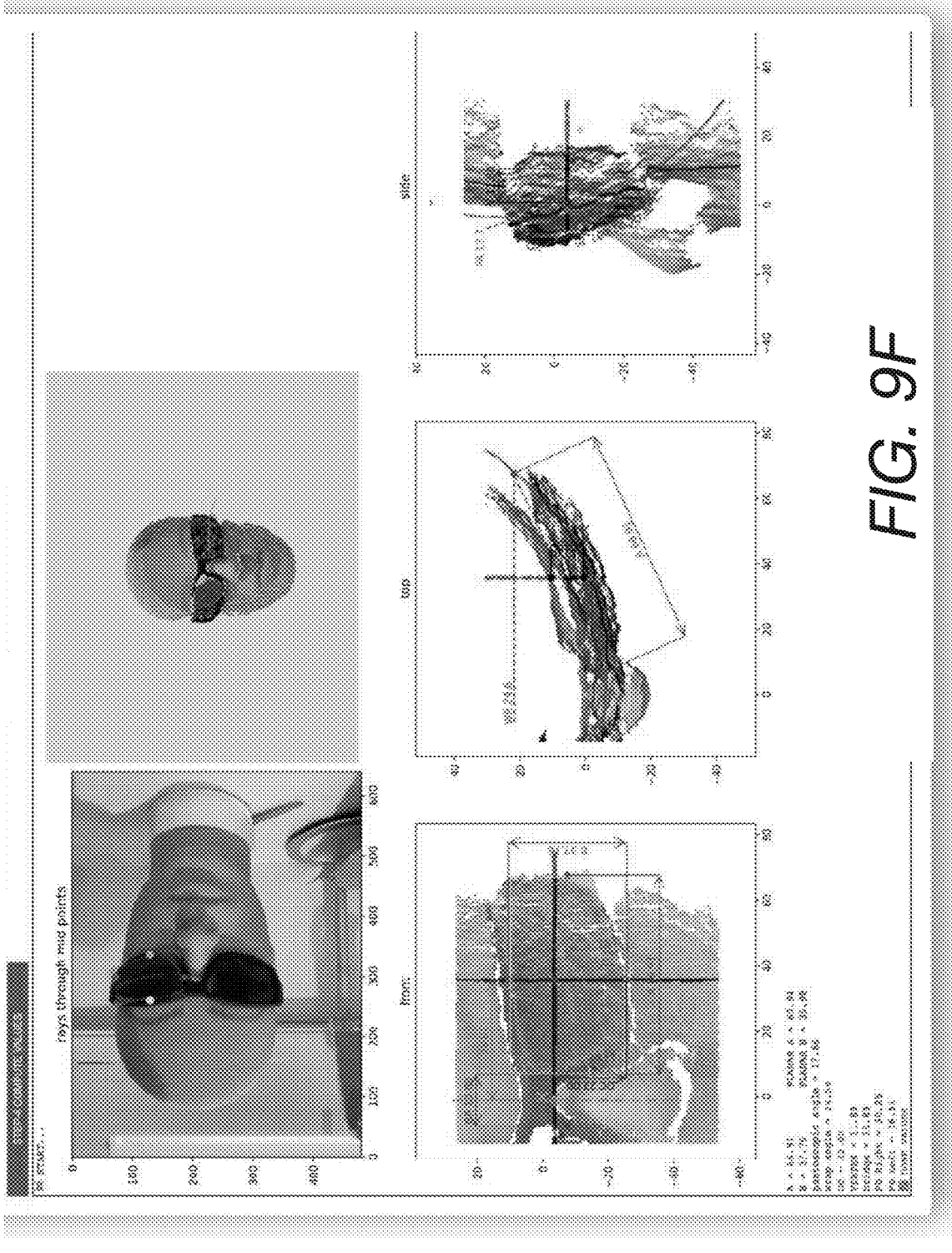
Figure 9G:
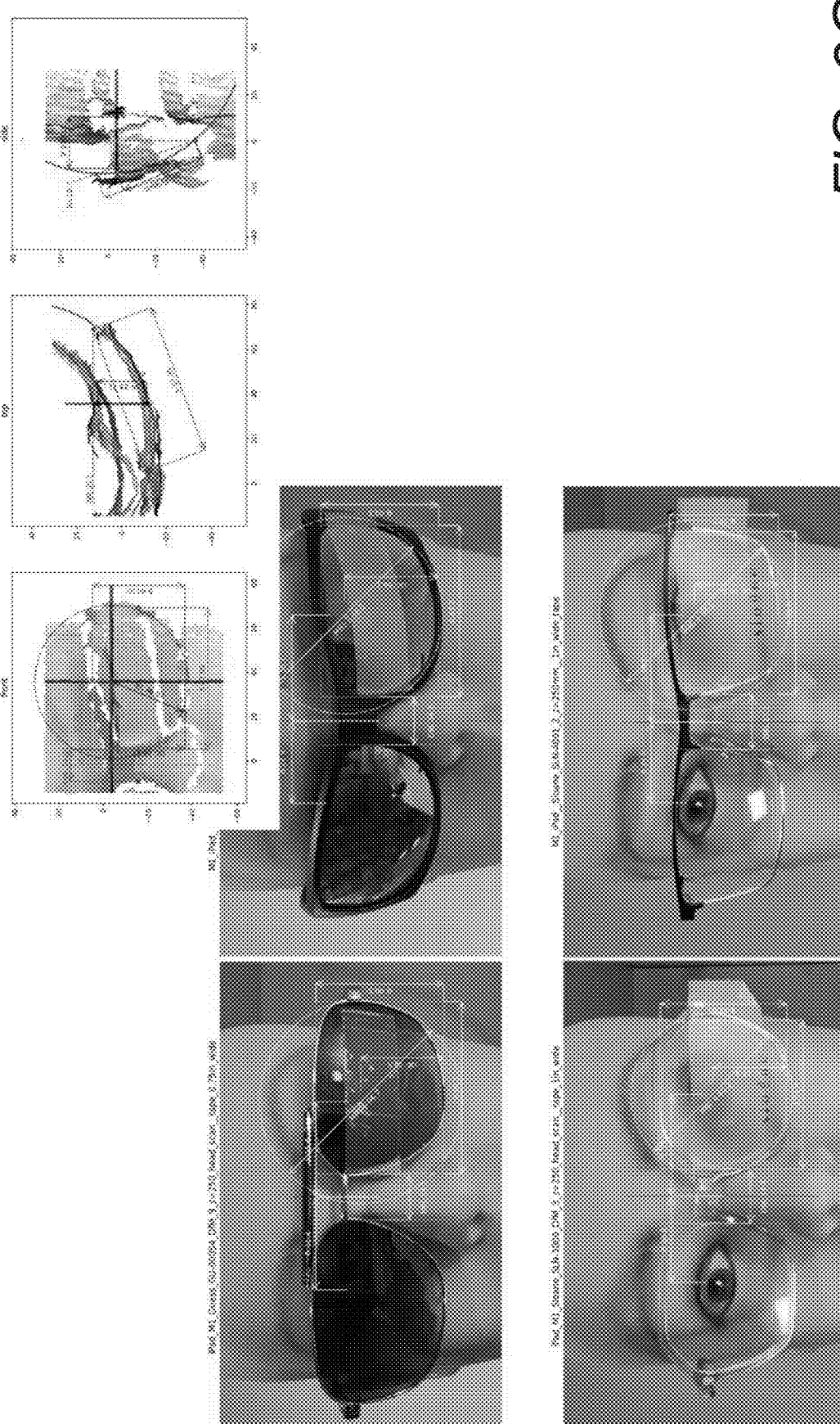

In furtherance of explaining the above embodiment, FIG. 9E shows a debug output of a functional Jupyter notebook performing step 964 within the confines of the box region, with the resulting fitted 3D sphere shown. FIG. 9F shows a different eyewear scan stup, with different views of the optical centration calculations performed (including fitted sphere positioning and cross-sections of the RGBD point cloud with measurements overlaid. FIG. 9G shows screenshots of successful measurements taken of various eyewear frames with a piece of scotch tape applied to the lens.

Expounding on the methods described in U.S. Pat. No. 11,592,691, once a 2-step tape scan is performed, an adjustment schematic can also be generated for the measured frame (so the frame measured can be put back on the shelf to be showcased to the next customer, while a different copy of the same frame is pulled from inventory at a lab, adjusted per this generated schematic, and then shipped to the store or directly to the customers home). Thanks to the presence of the ears from the pre-existing full 3D face scan, the system has all the points it needs to render a fitted schematic. However, it may not have a 3D model of the frame in question. In this instance, a simplistic "stick-figure schematic" can be generated that will be a wireframe representation of a typical eyewear frame (a few lines to indicate the temple and frame front), but with an overall shape necessary for an optician to follow should he/she place the actual frame in question over it to perform remote adjustments and fulfilment of this order.

In one embodiment, to perform a "stick-figure schematic," an optician may place a point in the frontal RGB 2D image that indicates the outermost point on the frame front (where the temple meets the front), the system may determine such points in a 3D representation of the 2D image to generate a better schematic, e.g., temple drop (asymmetric ear heights).

In one embodiment, the system may solve for nose-pad placement, for example, an optician may indicate the position and/or orientation of nose-pads that are contacting the nose (from a frontal 2D image). The system may process the image and the input from the optician to render the nose-pads in the correct place and orientation in a 3D space so that the lab may adjust the real frame to those positions.

Figure 7A:
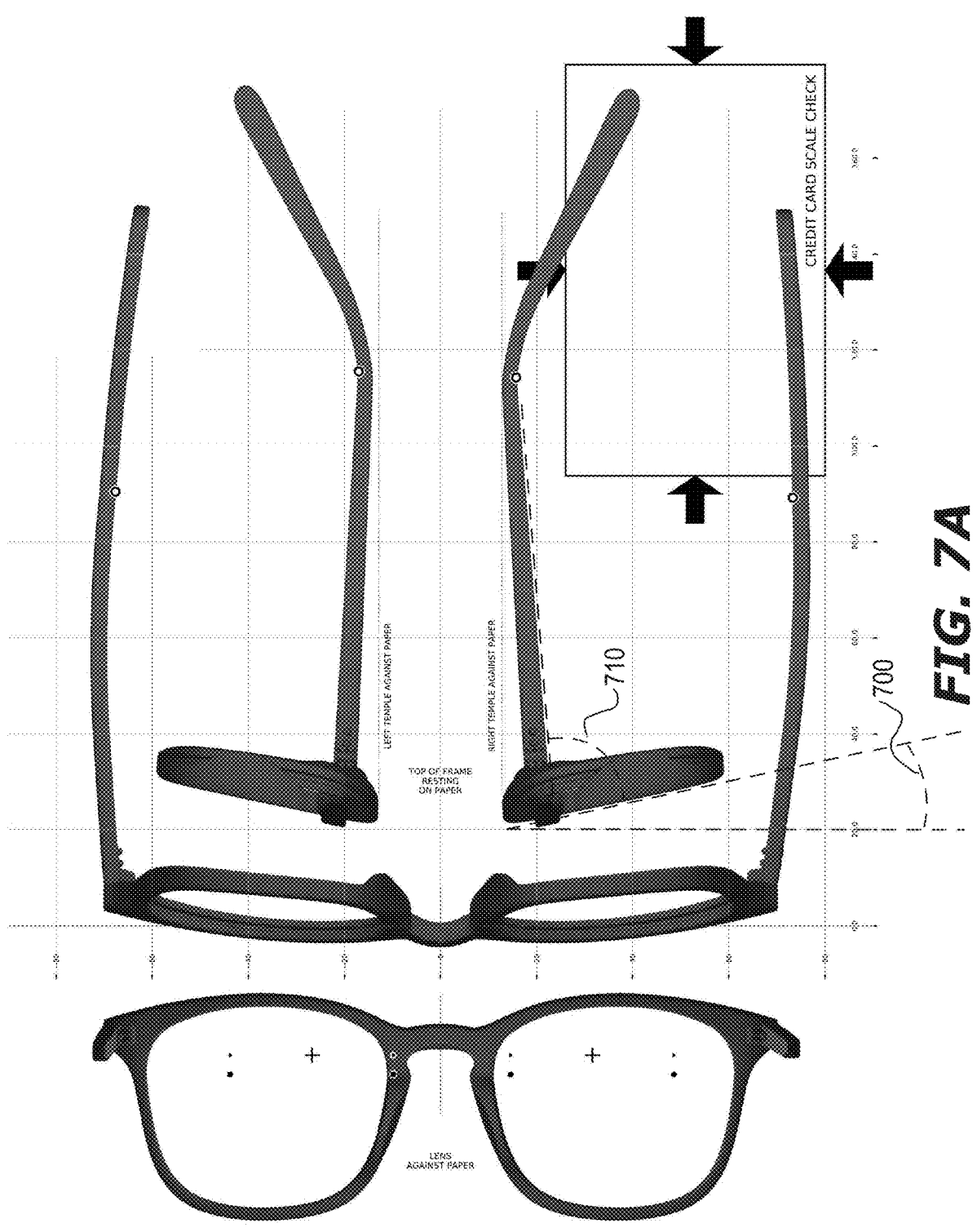
FIG. 7A-7B are two adjustment instruction schematics for the same frame, with FIG. 7A leaving pantoscopic angle as received from frame manufacturer, and FIG. 7B with the pantoscopic angle relaxed 50% in order to better fit a customer's face.
Figure 7B:
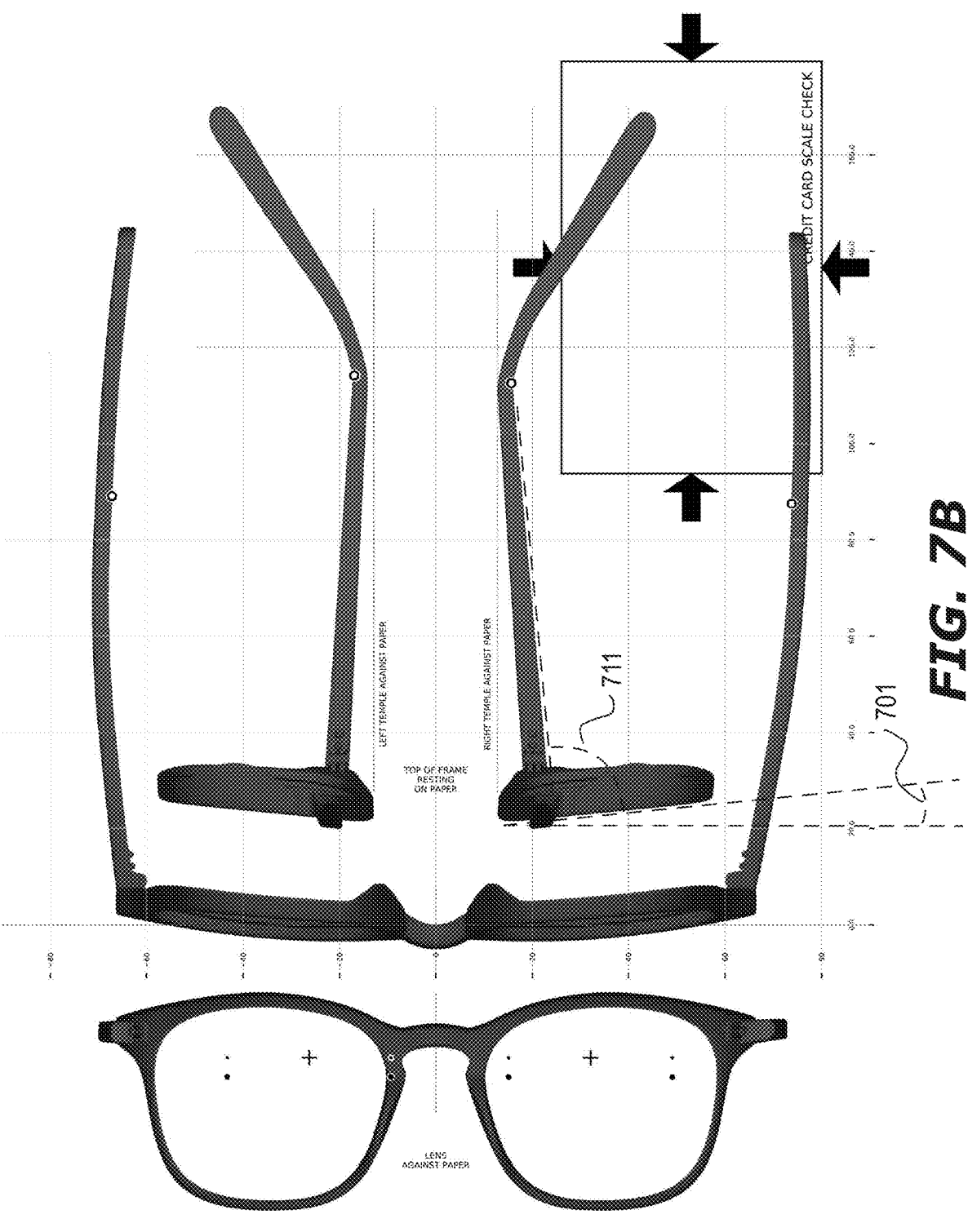

As discussed previously, the method discussed below extends the methods described in U.S. Pat. No. 11,592,691 in order to cover pantoscopic adjustment. Specifically, if a fitting algorithm determines that a relaxation (or increase) in pantoscopic tilt is required, it can intelligently apply such a deformation to the 3D frame model and leverage this resulting 3D frame to perform all optical centration measurements. Optionally, it can display this deformed 3D model in its virtual try-on, for an extra level of photorealism and physical fidelity. Additionally, it can render this deformed 3D model into an adjustment schematic in order to convey visually to an optician or technician how much to relax or increase pantoscopic tilt. FIGS. 7A and 7B show an adjustment schematic for the same patient and the same frame. In FIG. 7A, the inclination angle of the frame front relative to the temple is left unchanged (see 710). But in FIG. 7B, the pantoscopic angle is relaxed, and this change is thus physically and accurately reproduced at metric scale and properly rendered into a schematic so it is visually clear to the technician how much to relax when they lay the actual frame down over the printed schematic. Note that angle 711 is now greater, and angle 701 is now reduced.

Figure 8A:
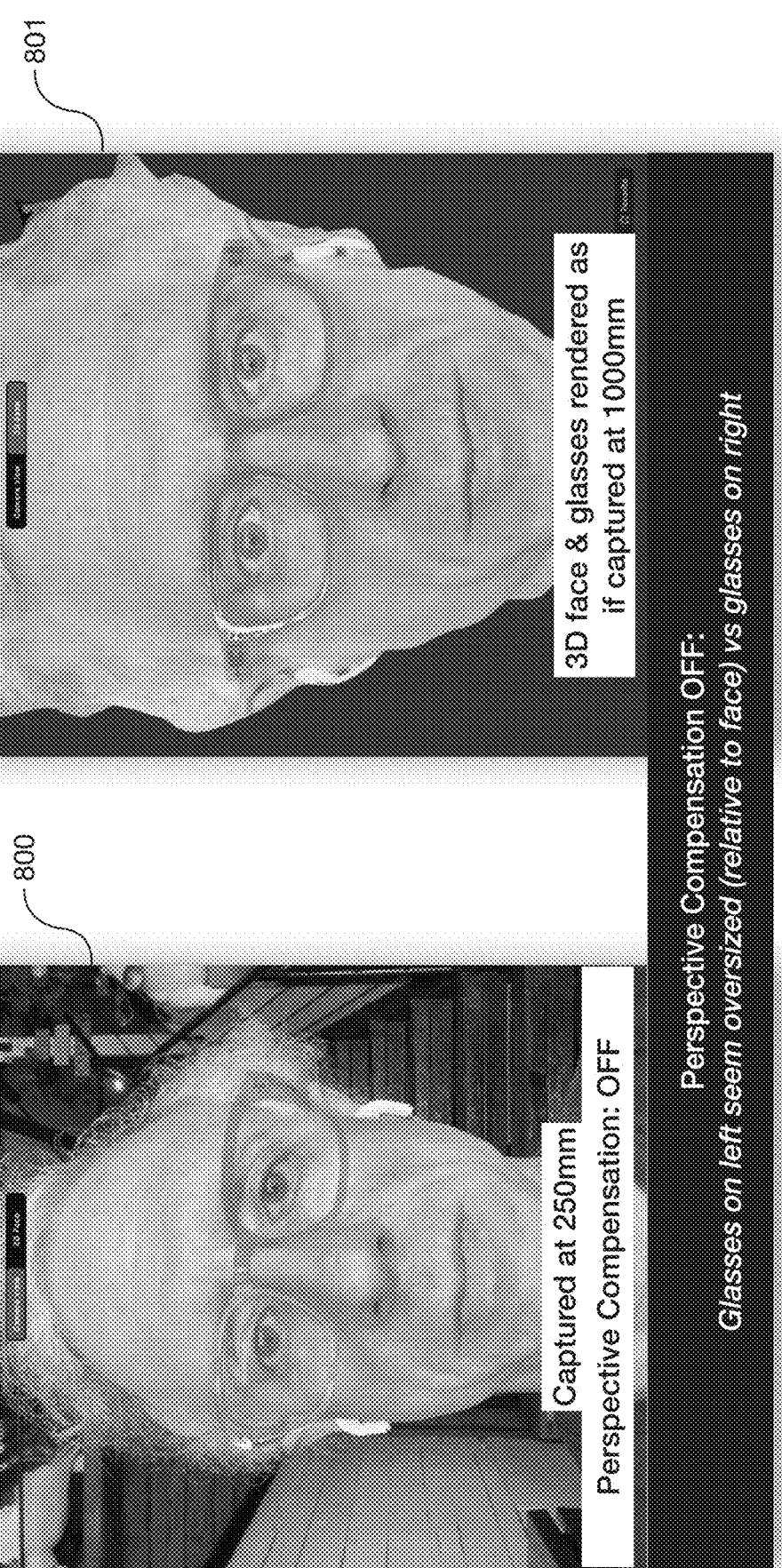
Figure 8B:
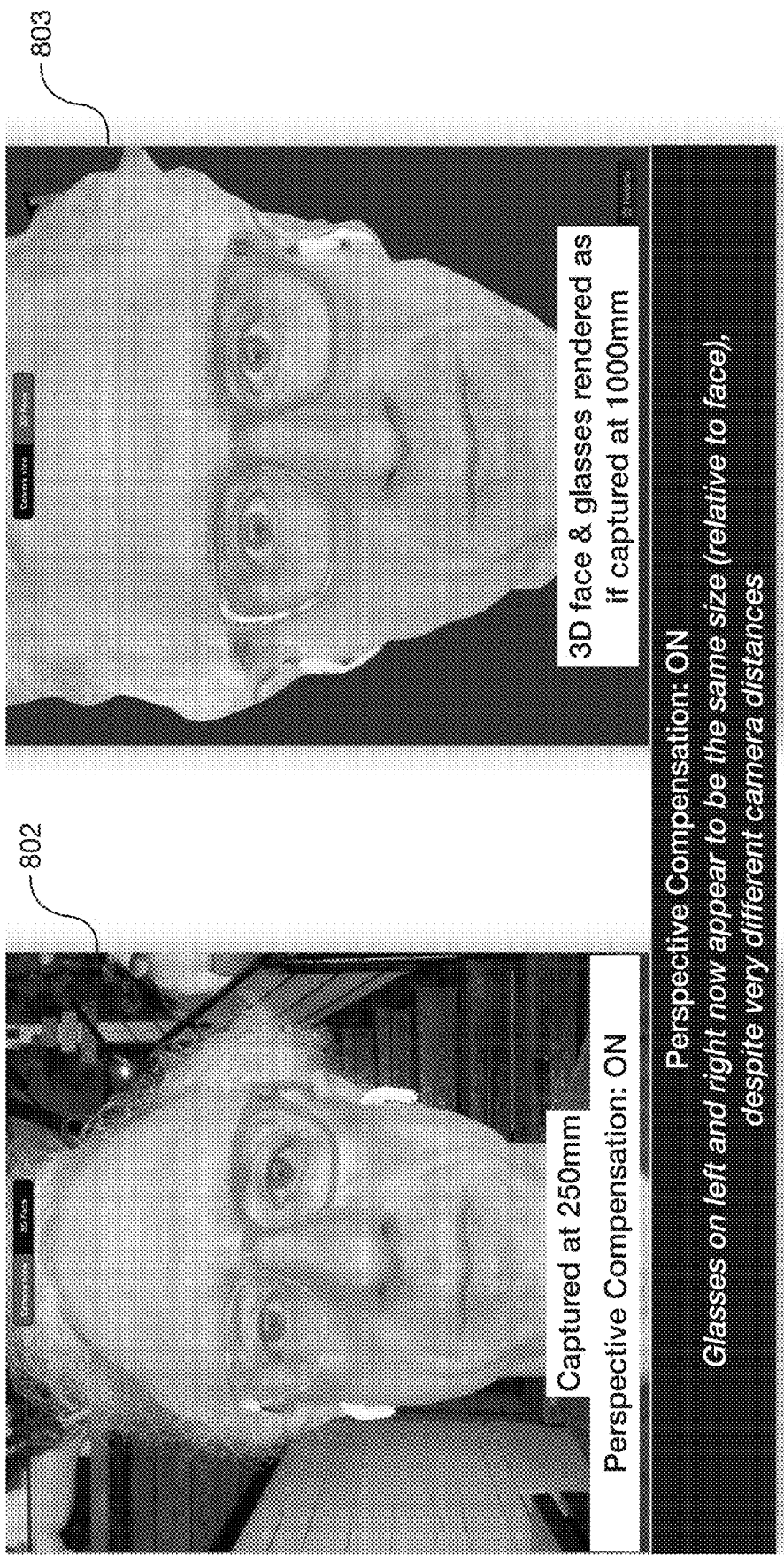

In the following embodiments, we discuss how to implement perspective correction. As discussed previously, the system is not rendering a frame in its neutral state (like every other VTO), but instead the system is rendering a frame post-adjusted (aka customized), i.e., a modified frame. In addition, the system may apply smart "perspective distortion" or "perspective correction". FIG. 8A visually shows the problem of perspective as previously discussed. 800 shows rendered glasses onto a face that was captured quite close (250 mm), and 801 shows how those glasses would appear to an observer if they were to stand 1 m away (or how the user would perceive themselves if they were to look in a mirror positioned 0.5 m away). With intelligent perspective correction applied, which preserves the bridge width, but then shrinks the lens accordingly such that the overall width of the front frame (2 lenses plus original bridge) is as desired, you can see the final result in FIG. 8B. Note how 802, now with perspective correction on approximates the look in 803 (rendered from 1 m away). Furthermore, the system intelligently scales the applied effect based on camera capture distance, so the desired result is achieved regardless of whether the capture was performed at 250 mm (more correction applied) or 350 mm (less correction applied). In this implementation, the vertical placement of the frames on face remains unchanged (aka the eyes are at the same proportional vertical position within lens), without affecting the fitting calculations, optical centration measurements, or resulting adjustment schematics. Furthermore, the temples are intelligently splayed outwards as the frame front is scaled smaller, so that the temples appear to extend right to the ears (as intended) in order to preserve the photorealism of the virtual try-on.

Figure 8F:
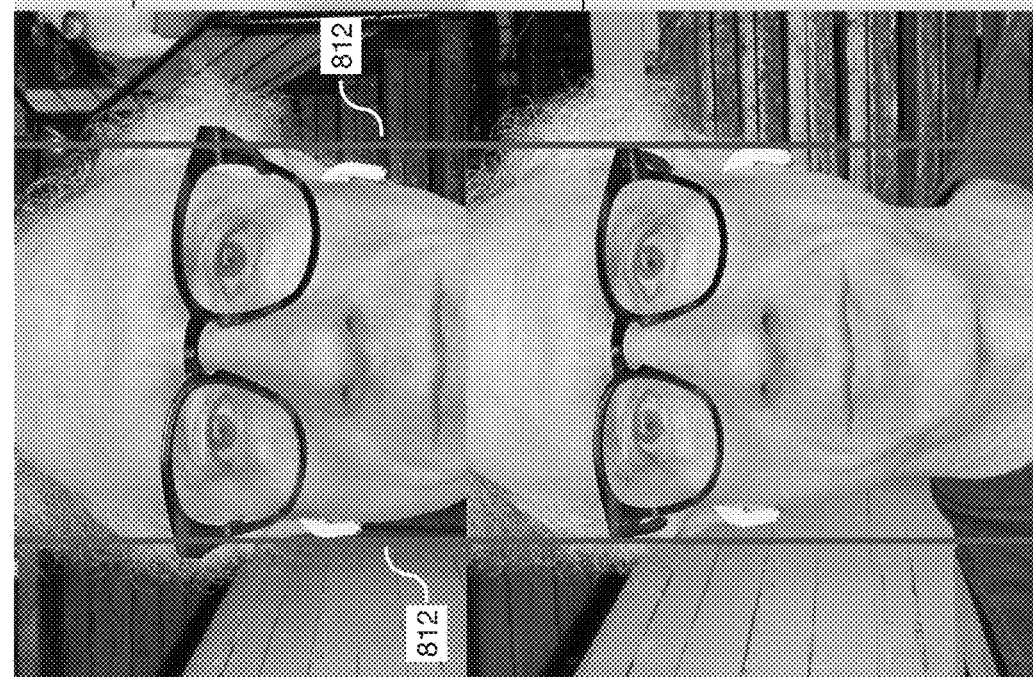
Figure 8G:
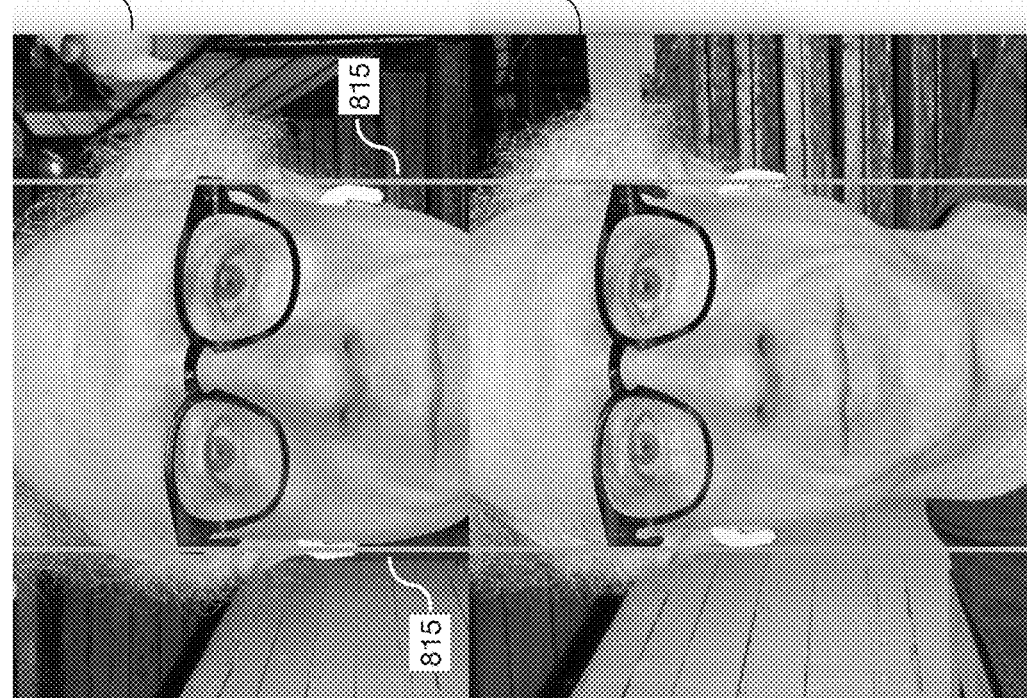

In FIGS. 8C-8E, you can see a side-by-side of the same face capture, with the same glasses, with the effect turned off on the left (804, 806, 808) and turned on in the image on the right (805, 807, 809). In FIG. 8F, you can better see how without perspective compensation, when two different captures of the same face are performed at different camera capture distances (250 mm and 350 mm), the same frame appears very different sizes with respect to the head. Lines 812 help to call out the differences in size. However in FIG. 8G, the system's perspective compensation is enabled for both renders, and though each is at a different capture distance, as shown by lines 815, the glasses appear the same relative size with respect to the head.

The system may implement newer reconstruction techniques, such as neural radiance fields, to solve for the 3D representation of an entire scene, and thus may be leveraged to intelligently render the original background image from a different novel capture position and camera focal distance. In this method, the system may distort the background image as if it was captured from farther away, and then render the glasses from that new vantage point. The system may also do this with classical computer vision techniques, filling in the holes that would ensure in each image by a GAN, or via information derived from other vantage points and/or resolved to a 3D mesh texture map.

In so doing, the virtual try-on with perspective correction enabled is rendering a product that not only does not physically exist in the real world, but it is rendering a completely novel, customized, and bespoke version of the product that is specific to the eyewear model in question, the 3D face of the user and resulting 3D facial landmarks, the specific capture distance of each image in the virtual try-on (camera extrinsic parameters), and the specific camera intrinsic parameters such as focal length and other distortion parameters.

In one embodiment, the system may also adjust natural head posture. The system may take into account the center of eye rotation to calculate changes in the optical height at a different face pitch than that initially reconstructed and textured.

In one embodiment, the system may cast shadows from a frame onto the face in a photorealistic manner. In another embodiment, the system may also cast shadows from a post-adjusted frame onto the face.

Currently, there are two approaches to VTO: (i) live-mirror VTO, e.g., fittingbox, Apple ARKit, Snapchat, etc., and (ii) record, process, and playback VTO, e.g., DITTO, Topology. The former may be faster (more instant-gratification) due to zero processing time, but has poor accuracy. The latter can leverage multiple images taken from multiple vantage points (and possibly depth) and may create a more-accurate mesh, but is slower to capture (and adds an undesirable delay until VTO results is shown to the user).

The system proposes a hybrid approach, that includes: use a live-mirror VTO, and as user is interacting with it and moving their head (glasses superimposed), save each underlying RGB image (before glasses superimposed), process said captured images (locally or in the cloud), reconstruct a more accurate 3D model, then align said model to a "lo-fi real-time live-mirror VTO." The system may constantly iterate/improve the model over time, and once sufficient frames are captured, the system stops iterating. Such alignment of pre-existing 3D model to real-time 2D or 3D traced facial points (live-mirror VTO) may also be done in real-time. Furthermore, techniques may be implemented to only stored and processed images of the face that meet certain face position criteria (face yaw, pitch, roll), or certain static face requirements (ignore images in which user is blinking, opening/moving mouth, etc.).

What would adversely affect the accuracy of a 3D face reconstruction that necessitates as little facial movement as possible (other than face yaw/pitch/roll repositioning).

The system may incorporate user interfaces (UI's) to let the user know the underlying mesh has been subsequently refined and is now "HD" or "enhanced accuracy." In one instance, real-time eyewear fitting algorithms or recommendation engines may switch over to leveraging this enhanced and real-time aligned-to-RGB images 3D model as soon as it is available (or only become enabled when the enhanced model is available). Furthermore, to enhance the photorealism and fidelity of the VTO, the rendering engine may switch over to using the now-enhanced 3D model for enhanced rendering effects such as occlusion, shadows (virtual eyewear casting shadows onto hidden enhanced 3D model such that enhanced shadows rendering on top of underlying RGB image in live mirror), etc.

This hybrid approach combines the instant-gratification of a live-mirror approach with the accuracy of a "record, process, and playback VTO" approach to yield a solution that is fast and accurate.

In the event of smart AR glasses with a laser projector (free-space combiner), the system may implement 3D VTO and fitting algorithms to take into account the ideal positioning of the laser projector relative to the optical center of the lens (pupil positioning horizontally and vertically), and also the embedded display that may be offset from optical center. Furthermore, if a free-space laser is projected, the system may also trace a ray from the projector to the target on the lens and ensure no portion of the face occludes this path. The system may also calculate the incidence angles and ensure they are within desired eyebox specifications for display acuity or battery efficiency.

Furthermore, smart glasses may have frame-adjustability constraints that may be different than traditional ophthalmic Rx frames. For example, the temples may not be able to have adjustable splay relative to the lens. The present system implements various fitting algorithms and adjustment schematics to take this into account. Furthermore, if a frame has adjustable nose-pads, the system may implement the fitting algorithm to move a frame on the nose such that desirable eyebox placement is satisfied given other constraints on the display system and lack of a diversity of frame sizes.

Figure 6:
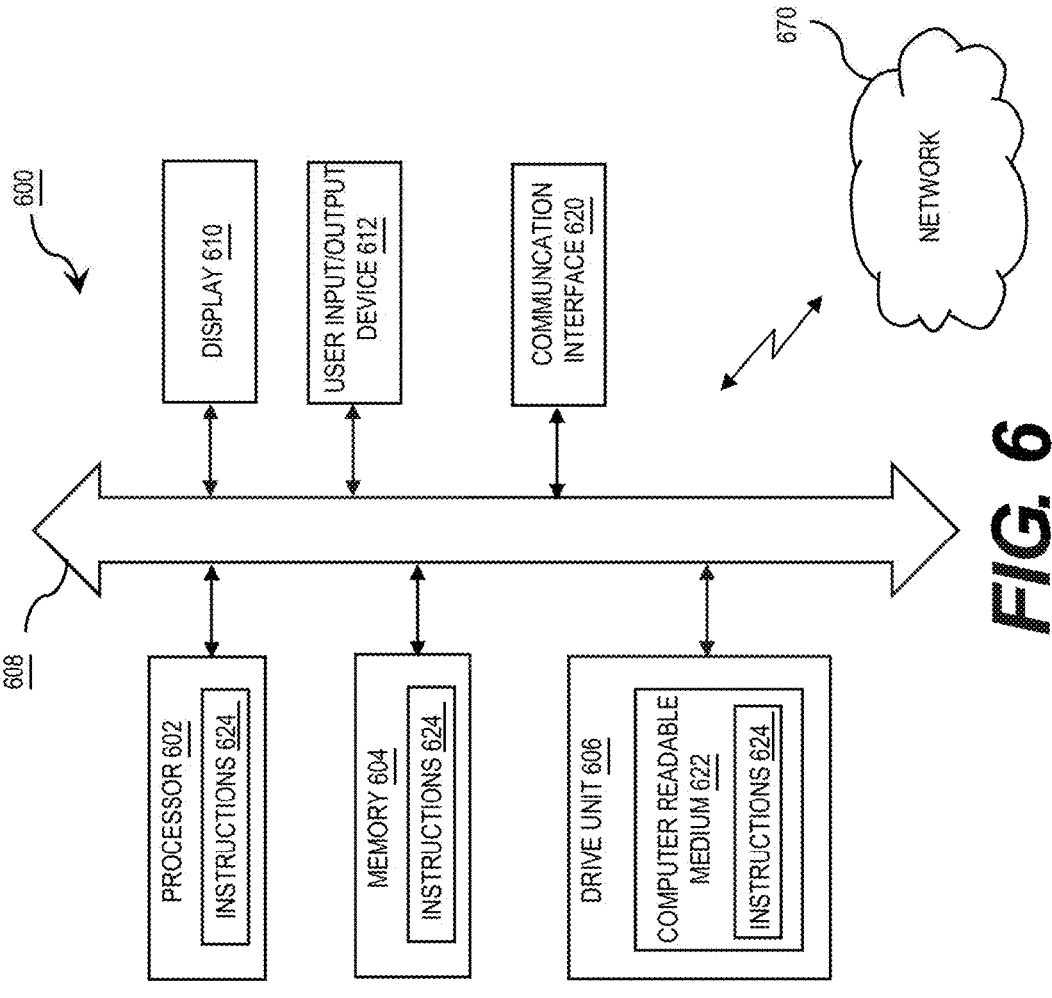
FIG. 6 illustrates an implementation of a general computer system that may execute techniques presented herein.

In various embodiments, the method discussed may be implemented in, for instance, a chip set including a processor and a memory as shown in FIG. 6. FIG. 6 illustrates an implementation of a general computer system that may execute techniques presented herein. The computer system 600 can include a set of instructions that can be executed to cause the computer system 600 to perform any one or more of the methods, system, or computer based functions disclosed herein. The computer system 600 may operate as a standalone device or may be connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

In a networked deployment, the computer system 600 may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a control system, a camera, a scanner, a facsimile machine, a personal trusted device, a web appliance, a network router, switch or bridge, or any other machine capable of executing a set of instructions (sequential or otherwise) that specify actions to be taken by that machine. In a particular implementation, the computer system 600 can be implemented using electronic devices that provide voice, video, or data communication. Further, while a computer system 600 is illustrated as a single system, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The computer system 600 may include a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random-access memory for the processor 602. In alternative implementations, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the processor 602 executing the instructions stored in the memory 604. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 600 may further include a display 610, such as a liquid crystal display (LCD), an organic light emitting diode (OLED), a flat panel display, a solid-state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive unit 606.

Additionally or alternatively, the computer system 600 may include an input/output device 612 configured to allow a user to interact with any of the components of computer system 600. The input/output device 612 may be a number pad, a keyboard, or a cursor control device, such as a mouse, or a joystick, touch screen display, remote control, or any other device operative to interact with the computer system 600.

The computer system 600 may also or alternatively include drive unit 606 implemented as a disk or optical drive. The drive unit 606 may include a computer-readable medium 622 in which one or more sets of instructions 624, e.g. software, can be embedded. Further, instructions 624 may embody one or more of the methods or logic as described herein. The instructions 624 may reside completely or partially within the memory 604 and/or within the processor 602 during execution by the computer system 600.

The memory 604 and the processor 602 also may include computer-readable media as discussed above.

In some systems, a computer-readable medium 622 includes instructions 624 or receives and executes instructions 624 responsive to a propagated signal so that a device connected to a network 670 can communicate voice, video, audio, images, or any other data over the network 670. Further, the instructions 624 may be transmitted or received over the network 670 via a communication port or interface 620, and/or using a bus 608. The communication port or interface 620 may be a part of the processor 602 or may be a separate component. The communication port or interface 620 may be created in software or may be a physical connection in hardware. The communication port or interface 620 may be configured to connect with a network 670, external media, the display 610, or any other components in computer system 600, or combinations thereof. The connection with the network 670 may be a physical connection, such as a wired Ethernet connection or may be established wirelessly as discussed below. Likewise, the additional connections with other components of the computer system 600 may be physical connections or may be established wirelessly. The network 670 may alternatively be directly connected to a bus 608.

While the computer-readable medium 622 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 622 may be non-transitory, and may be tangible.

The computer-readable medium 622 can include a solid-state memory such as a memory card or other package that houses one or more non-volatile read-only memories. The computer-readable medium 622 can be a random-access memory or other volatile re-writable memory. Additionally or alternatively, the computer-readable medium 622 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 600 may be connected to a network 670. The network 670 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 670 may include wide area networks (WAN), such as the Internet, local area networks (LAN), campus area networks, metropolitan area networks, a direct connection such as through a Universal Serial Bus (USB) port, or any other networks that may allow for data communication. The network 670 may be configured to couple one computing device to another computing device to enable communication of data between the devices. The network 670 may generally be enabled to employ any form of machine-readable media for communicating information from one device to another. The network 670 may include communication methods by which information may travel between computing devices. The network 670 may be divided into sub-networks. The sub-networks may allow access to all of the other components connected thereto or the sub-networks may restrict access between the components. The network 670 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method comprising:
   receiving, by an image assessment platform, a digital input, wherein the digital input includes an image of a user's face and a known-sized object, and wherein the known-sized object is positioned against a screen adjacent to a camera of a user device;

generating, by the image assessment platform, a plurality of instructions in a user interface of the user device for tracking eye movements of the user, wherein the plurality of instructions include a first instruction to look at a first feature of the known-sized object, a second instruction to look at a second feature of the known-sized object, and a third instructions to look into a distance beyond the known-sized object;

tracking, by the image assessment platform, a plurality of points on the user's face, wherein the plurality of points include points around the user's eyelids, nose, eyebrows, mouth, and/or ears;

calculating, by the image assessment platform, one or more distances between the plurality of points to account for changes in head positions of the user looking at the first feature, the second feature, and into the distance beyond the known-sized object in a same frame as the known-sized object; and generating, by the image assessment platform, a scaled reconstruction of the user's face, a recommendation on virtual try-on glasses, or a combination thereof based, at least in part, on the tracking of the eye movements, one or more calculations based on one or more equations, or a combination thereof.

2. The method of claim 1, wherein positioning the known-sized object against the screen adjacent to the camera of the user device comprises:
   generating, by the image assessment platform, a first notification to align the known-sized object within a user interface element of the user interface; and
   generating, by the image assessment platform, a second notification confirming that the known-sized object is properly aligned within the user interface element, wherein the first and second notifications include an aural or a visual notification.

3. The method of claim 2, wherein the image assessment platform utilizes computer vision techniques, face detectors, and/or face yaw/pitch/roll estimators to guide the user into a proper orthogonally facing the camera.

4. The method of claim 3, wherein tracking the eye movements comprises:
   capturing, by the image assessment platform via one or more sensors, a video or a plurality of images of the user looking at the first feature of the known-sized object, the second feature of the known-sized object, and into the distance beyond the known-sized object in the same frame as the known-sized object; and
   processing, by the image assessment platform, the video or the plurality of images to determine relative size of a user's anatomy including pupillary distance as a function of a measured size of the known-sized object.

5. The method of claim 4, wherein tracking the eye movements further comprises:
   detecting in real-time, by the image assessment platform via the one or more sensors, pupils of the user looking at the first feature of the known-sized object, the second feature of the known-sized object, and into the distance beyond the known-sized object.

6. The method of claim 4, wherein generating the recommendation on the virtual try-on glasses comprises:
   causing, by the image assessment platform, a deformation of a three-dimensional frame model to cause a relaxation or an increase in a pantoscopic tilt; and
   causing, by the image assessment platform, optical centration measurements.

7. The method of claim 6, further comprising:

generating, by the image assessment platform, a display of the deformed three-dimensional frame model as a virtual try-on glass.

8. The method of claim 6, further comprising:

generating, by the image assessment platform, the deformed three-dimensional frame model as an adjustment schematic to visually convey the relaxation or the increase in the pantoscopic tilt to an expert user, wherein the expert user is an optician or technician.

9. The method of claim 1, wherein the known-sized object has a standard and known dimensions.

10. A system comprising:

one or more processors of a computing system; and at least one non-transitory computer readable medium storing instructions which, when executed by the one or more processors, cause the one or more processors to perform operations comprising:

receiving, by an image assessment platform, a digital input, wherein the digital input includes an image of a user's face and a known-sized object, and wherein the known-sized object is positioned against a screen adjacent to a camera of a user device;

generating, by the image assessment platform, a plurality of instructions in a user interface of the user device for tracking eye movements of the user, wherein the plurality of instructions include a first instruction to look at a first feature of the known-sized object, a second instruction to look at a second feature of the known-sized object, and a third instructions to look into a distance beyond the known-sized object;

tracking, by the image assessment platform, a plurality of points on the user's face, wherein the plurality of points include points around the user's eyelids, nose, eyebrows, mouth, and/or ears;

calculating, by the image assessment platform, one or more distances between the plurality of points to account for changes in head positions of the user looking at the first feature, the second feature, and into the distance beyond the known-sized object in a same frame as the known-sized object; and generating, by the image assessment platform, a scaled reconstruction of the user's face, a recommendation on virtual try-on glasses, or a combination thereof based, at least in part, on the tracking of the eye movements, one or more calculations based on one or more equations, or a combination thereof.

11. The system of claim 10, wherein positioning the known-sized object against the screen adjacent to the camera of the user device comprises:

generating, by the image assessment platform, a first notification to align the known-sized object within a user interface element of the user interface, wherein the known-sized object has a standard and known dimensions; and generating, by the image assessment platform, a second notification confirming that the known-sized object is properly aligned within the user interface element, wherein the first and second notifications include an aural or a visual notification.

12. The system of claim 11, wherein the image assessment platform utilizes computer vision techniques, face detectors, and/or face yaw/pitch/roll estimators to guide the user into a proper orthogonally facing the camera.

13. The system of claim 12, wherein tracking the eye movements comprises:

capturing, by the image assessment platform via one or more sensors, a video or a plurality of images of the user looking at the first feature of the known-sized object, the second feature of the known-sized object, and into the distance beyond the known-sized object in the same frame as the known-sized object; and processing, by the image assessment platform, the video or the plurality of images to determine relative size of a user's anatomy including pupillary distance as a function of a measured size of the known-sized object.

14. The system of claim 13, wherein tracking the eye movements further comprises:

detecting in real-time, by the image assessment platform via the one or more sensors, pupils of the user looking at the first feature of the known-sized object, the second feature of the known-sized object, and into the distance beyond the known-sized object.

15. The system of claim 13, wherein generating the recommendation on the virtual try-on glasses comprises:

causing, by the image assessment platform, a deformation of a three-dimensional frame model to cause a relaxation or an increase in a pantoscopic tilt;

causing, by the image assessment platform, optical centration measurements; and generating, by the image assessment platform, a display of the deformed three-dimensional frame model as a virtual try-on glass.

16. A non-transitory computer readable medium, the non-transitory computer readable medium storing instructions which, when executed by one or more processors of a computing system, cause the one or more processors to perform operations comprising:

receiving, by an image assessment platform, a digital input, wherein the digital input includes an image of a user's face and a known-sized object, and wherein the known-sized object is positioned against a screen adjacent to a camera of a user device;

generating, by the image assessment platform, a plurality of instructions in a user interface of the user device for tracking eye movements of the user, wherein the plurality of instructions include a first instruction to look at a first feature of the known-sized object, a second instruction to look at a second feature of the known-sized object, and a third instructions to look into a distance beyond the known-sized object;

tracking, by the image assessment platform, a plurality of points on the user's face, wherein the plurality of points include points around the user's eyelids, nose, eyebrows, mouth, and/or ears;

calculating, by the image assessment platform, one or more distances between the plurality of points to account for changes in head positions of the user looking at the first feature, the second feature, and into the distance beyond the known-sized object in a same frame as the known-sized object; and generating, by the image assessment platform, a scaled reconstruction of the user's face, a recommendation on virtual try-on glasses, or a combination thereof based, at least in part, on the tracking of the eye movements, one or more calculations based on one or more equations, or a combination thereof.

17. The non-transitory computer readable medium of claim 16, wherein positioning the known-sized object against the screen adjacent to the camera of the user device comprises:

generating, by the image assessment platform, a first notification to align the known-sized object within a user interface element of the user interface; and generating, by the image assessment platform, a second notification confirming that the known-sized object is properly aligned within the user interface element, wherein the first and second notifications include an aural or a visual notification.

18. The non-transitory computer readable medium of claim 17, wherein the image assessment platform utilizes computer vision techniques, face detectors, and/or face yaw/pitch/roll estimators to guide the user into a proper orthogonally facing the camera.

\* \* \* \* \*